(12) United States Patent
Shiina

(10) Patent No.: US 8,954,528 B2
(45) Date of Patent: Feb. 10, 2015

(54) DLNA CONTENT CONVERSION DEVICE, DLNA CONTENT CONVERSION METHOD, AND DLNA CONTENT CONVERSION PROGRAM

(75) Inventor: Makoto Shiina, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 379 days.

(21) Appl. No.: 13/421,117

(22) Filed: Mar. 15, 2012

(65) Prior Publication Data

US 2012/0265845 A1  Oct. 18, 2012

(30) Foreign Application Priority Data

Apr. 14, 2011 (JP) ................. 2011-090448

(51) Int. Cl.
*G06F 15/16* (2006.01)
*G06F 17/30* (2006.01)

(52) U.S. Cl.
CPC .... *G06F 17/30873* (2013.01); *G06F 17/30235* (2013.01)
USPC .......................... 709/217; 709/203; 709/218

(58) Field of Classification Search
CPC ..................... G06F 17/30235; G06F 17/30873
USPC ........................................ 709/217, 203, 218
See application file for complete search history.

(56) References Cited

U.S. PATENT DOCUMENTS

| 5,721,916 | A | 2/1998 | Pardikar | |
|---|---|---|---|---|
| 8,583,732 | B2 * | 11/2013 | Bae et al. | 709/204 |
| 2007/0237115 | A1 * | 10/2007 | Bae et al. | 370/331 |
| 2008/0235358 | A1 * | 9/2008 | Moribe et al. | 709/220 |
| 2008/0250151 | A1 * | 10/2008 | Tomita | 709/229 |
| 2009/0100147 | A1 * | 4/2009 | Igarashi | 709/218 |
| 2009/0222514 | A1 * | 9/2009 | Igarashi | 709/203 |
| 2010/0036907 | A1 * | 2/2010 | Douillet et al. | 709/203 |
| 2011/0238715 | A1 | 9/2011 | Quinn et al. | |

FOREIGN PATENT DOCUMENTS

| EP | 2000915 A2 | 12/2008 |
|---|---|---|
| JP | 2007-272868 A2 | 10/2007 |
| WO | 2004004222 A1 | 1/2004 |

OTHER PUBLICATIONS

Ben Laurie et al.,"Apache: The Definitive Guide, Passage", Apache: The Definitive Guide, XX, XX, Jan. 1, 1999, pp. 31-37, p. 34.

* cited by examiner

*Primary Examiner* — Michael C Lai
(74) *Attorney, Agent, or Firm* — Mattingly & Malur, PC

(57) ABSTRACT

A function of browsing web content using a DLNA-compliant player device is provided. A DLNA (Digital Living Network Alliance) content conversion device converts a structure of navigation tags represented by HTML (Hyper TextMarkup Language) data into a folder structure on a DLNA server having the same hierarchical structure as the hierarchical structure of the navigation tags.

12 Claims, 19 Drawing Sheets

FIG. 3
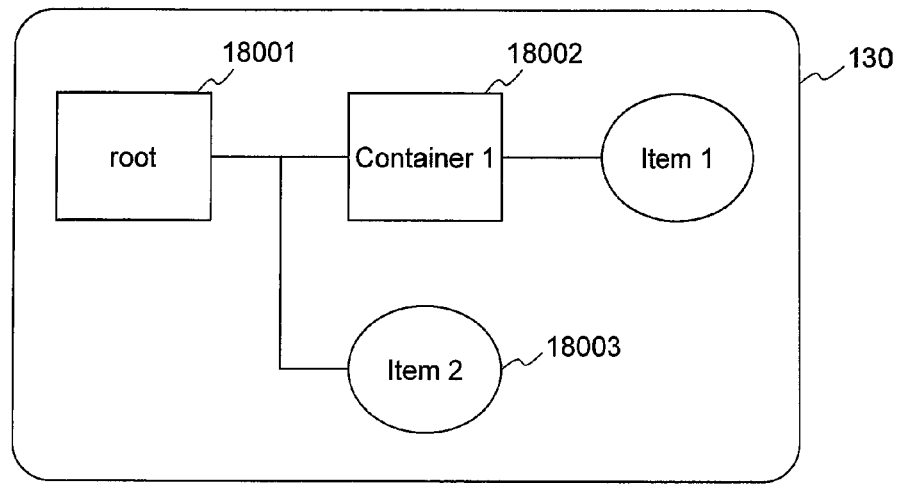
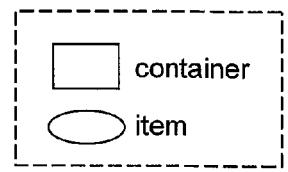
FIG. 4
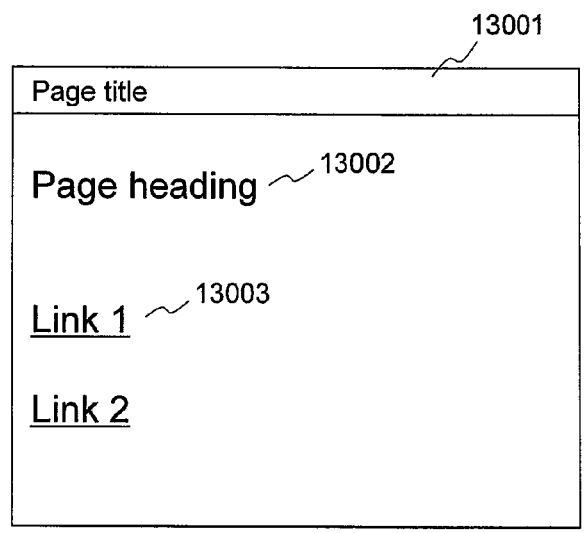

| ObjectID | Type | Name | Parent ID | Browser state ID | URL |
|---|---|---|---|---|---|
| 0 | container | Home | -1 | | http://www.home.jp/index.html |
| 1 | item | Title | 0 | | http://www.home.jp/index.html |
| 2 | item | Link 1 | 0 | 1 | |
| 3 | form | Select | 0 | 2 | |

```
<DIDL-Lite xmlns:dc="http://purl.org/dc/elements/1.1/"
            xmlns:upnp="urn:schemas-upnp-org:metadata-1-0/upnp/"         17001
            xmlns="urn:schemas-upnp-org:metadata-1-0/DIDL-Lite/">
                    17003       17004        17005
    <item id="2" parentID="0" restricted="true">
17002
        <dc:title>Page title</dc:title>
17006
        <upnp:class>
17007
            object.item.imageItem
        </upnp:class>    17009
                                                                            17010
        <res protocolInfo="http-get:*:image/jpeg:*">
17008
            http://[IP address of DLNA-compliant server for conversion]/htmldms/?id=1
        </res>
    </item>
                    17012       17013
    <container id="3" parentID="0" restricted=" true ">
17011
        <dc:title>Link 1</dc:title>
17014
        <upnp:class>
17015
            object.item.container
        </upnp:class>
    </container>

<container id="4" parentID="0" restricted=" true ">
        <dc:title>Link 2</dc:title>
        <upnp:class>
            object.item.container
        </upnp:class>
    </container>
</DIDL-Lite>
```

FIG. 13

```
<html>
    <head>
        <title>Page title</title>
    </head>
    <body>
        <h1>Page heading</h1>
        <form action="submit.php">                           13006
            <input type="text" name="data" value="Text"/>
            <br>                                             13007
            <input type="submit" value="Submit "/>
        </form>
    </body>
</html>
```

FIG. 14
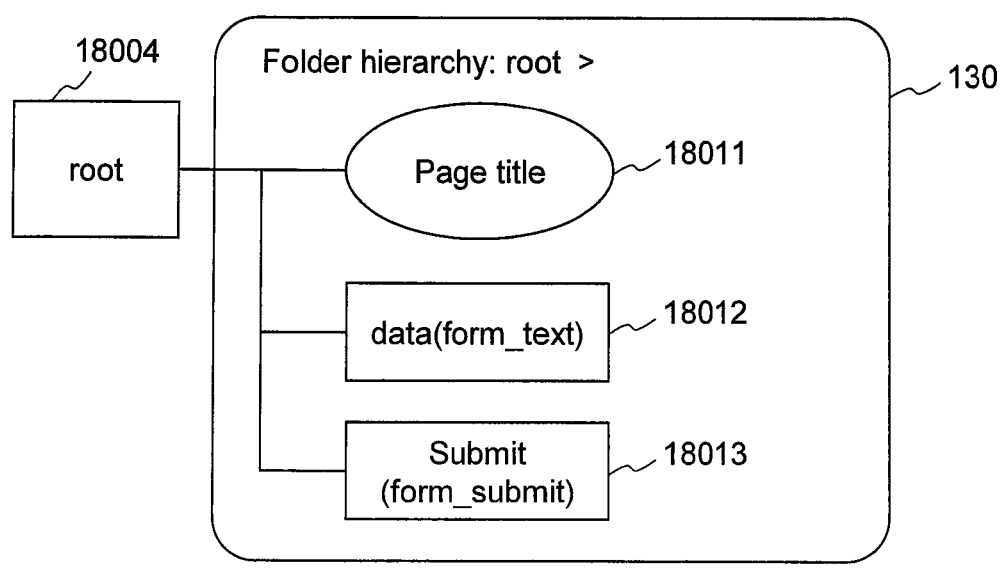
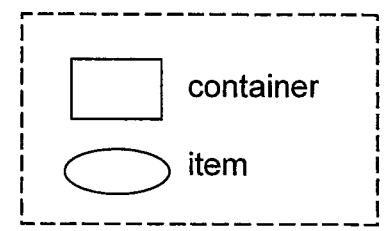

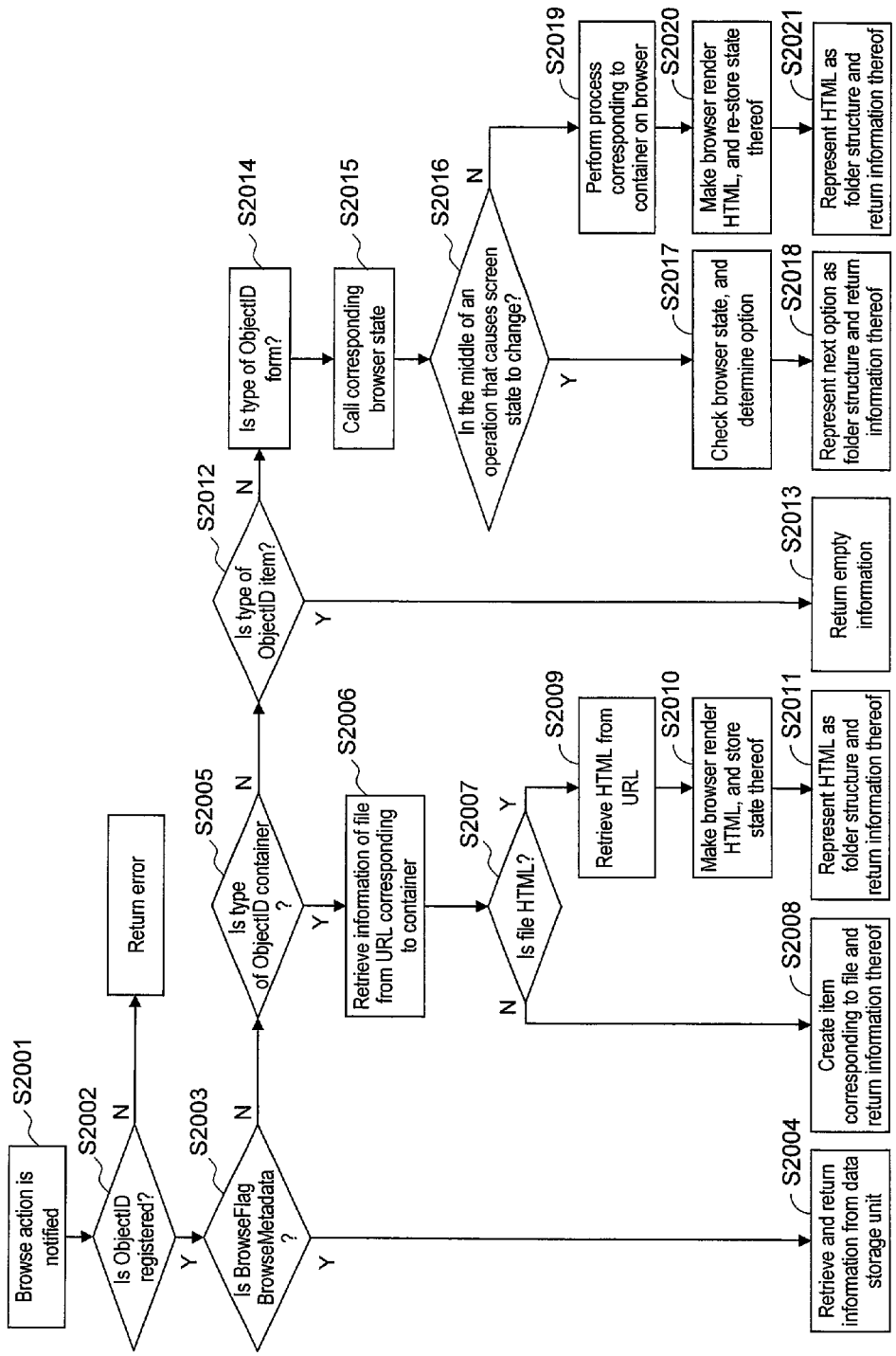

DLNA CONTENT CONVERSION DEVICE, DLNA CONTENT CONVERSION METHOD, AND DLNA CONTENT CONVERSION PROGRAM

This application claims priority from Japanese Patent Application No. 2011-090448, filed Apr. 14, 2011.

BACKGROUND

1. Technical Field

The present invention relates to a technique that provides a web-browsing function using an information device that is installed within a home network and that has player functionality compliant with DLNA (Digital Living Network Alliance) guidelines.

2. Background Art

As LANs (Local Area Networks) have become more commonplace in the home, many household appliances now use communications functions. With respect to visual appliances, such as TVs, etc., too, products equipped with a function for sharing content, etc., using a communications function have been introduced.

DLNA establishes guidelines for defining technical specifications, etc., for sharing content among visual appliances. By implementing functions compliant with DLNA guidelines, it becomes possible to share content freely even among devices of different vendors. For this reason, DLNA guidelines have become the standard in the field.

Further, with the popularization of DLNA, efforts to make it possible to use, via DLNA devices, data that cannot ordinarily be handled by DLNA or content outside of home networks are also beginning to increase. JP Patent Application Publication (Kokai) No. 2007-272868 A (Patent Document 1) is a related art document regarding one such technique.

Patent Document 1 discloses a visual device, as well as the techniques involved in a system thereof, having a function for using VoD (Video on Demand) services where access is made utilizing DLNA's framework and via a portal site created with HTML (HyperText Markup Language) pages.

On the other hand, through the communications functions visual appliances are now equipped with, new functions are beginning to be realized. In particular, due to the increasing importance of the Internet in our everyday lives, various devices, e.g., TVs, STBs (Set Top Boxes), etc., are equipped with internet browsing functions.

SUMMARY

DLNA-compliant player devices (digital media players, or DMPs) comprise a function of playing content held by likewise DLNA-compliant content servers (digital media servers, or DMSs). However, since the function for browsing such web content as HTML pages, etc., is a function that is distinct from DLNA, the availability of this function varies from player device to player device.

DLNA and HTML pages differ particularly in the manner they navigate among content. HTML pages comprise, as navigation, a mechanism for linking to other web content, e.g., HTML pages, etc., in HyperLink format. On the other hand, DMSs store individual content files within folders resembling a file system on an OS (Operating System), and provide navigation among content by presenting a list of folders and files to DMPs.

Due to the above-mentioned differences regarding navigation, DMPs are generally incapable of directly playing web content. Thus, DMPs have to be provided with a web browser in addition to a function of playing DLNA content, as a result of which it may be said that they tend to be more complicated in their functionality as client terminals.

The present invention is made with a view to solving such problems as those mentioned above, and an object thereof is to provide a function of browsing web content using a DLNA-compliant player device.

A DLNA content conversion device according to the present invention converts a structure of navigation tags represented by HTML data into a folder structure on a DLNA server having the same hierarchical structure as the hierarchical structure of the navigation tags.

With a DLNA content conversion device according to the present invention, web content may be used with any player as long as it is a DLNA-compliant player (DMP).

BRIEF DESCRIPTION OF THE DRAWINGS

FIG. 3 is a diagram showing a common structure of DLNA-compliant content held by the DMS 100.

FIG. 4 is a diagram showing a screen display example of an HTML page.

FIG. 5 is converted into a DLNA-compliant folder structure.

FIG. 11 is a diagram showing an example of data describing a folder structure that is created when a data conversion unit 170 receives a Browse action from the DMP 200.

FIG. 13 is a diagram showing HTML source code for the HTML page shown in FIG. 12.

FIG. 14 is a diagram showing a folder structure representation of the HTML page in FIG. 13.

FIG. 20 is a diagram showing a process flow for when the DMS 100 has received a content search request from the DMP 200.

DETAILED DESCRIPTION OF PREFERRED EMBODIMENTS

Embodiment 1

Figure 1:
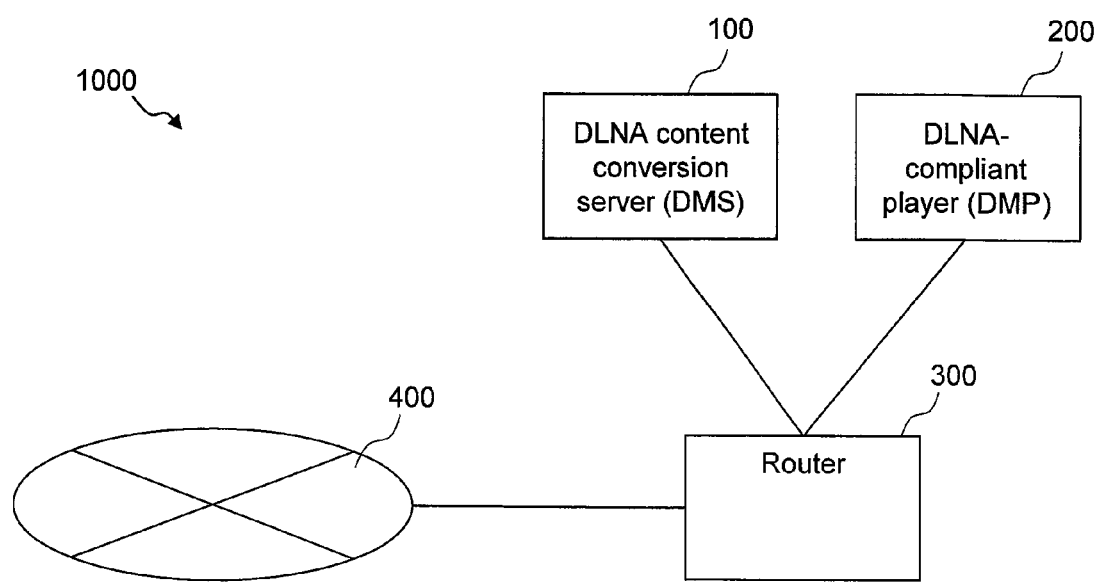
FIG. 1 is a configuration diagram of a DLNA browsing system 1000 according to Embodiment 1.

FIG. 1 is a configuration diagram of a DLNA browsing system 1000 according to Embodiment 1 of the present invention. The DLNA browsing system 1000 is a system for browsing web content using a DLNA-compliant player device, and comprises a DLNA content conversion server (DMS) 100, a DLNA-compliant player (DMP) 200, and a router 300.

The DLNA content conversion server 100 accesses a web server (not shown) via the router 300 and an external network 400, retrieves web content such as HTML pages, etc., and converts them to a format that is playable by the DLNA-compliant player 200. Details of the conversion process are discussed later. Thus, the DLNA-compliant player 200 is able to browse web content by handling them as it would DLNA content. It is noted that since the DLNA content conversion server 100 is a device that provides web content as DLNA content, it is equipped with DMS functionality. In the description below, the DLNA content conversion server 100 is referred to as DMS 100 for short.

The DLNA compliant player 200 is a DLNA-compliant player device. The DLNA-compliant player 200 recognizes the presence of the DMS 100 through UPnP (Universal Plug and Play), which is an inter-device recognition mechanism defined in DLNA guidelines. Upon recognition of the DMS 100 by the DLNA-compliant player 200, the user operates the DLNA-compliant player 200 using a remote control, etc., and browses content held by the DMS 100. In the description below, the DLNA-compliant player 200 is referred to as DMP 200 for short.

The router 300 builds a LAN by assigning IP (Internet Protocol) addresses to the DMS 100 and the DMP 200, while also connecting these devices with the external network 400, thereby enabling internet use from the LAN-side.

Figure 2:
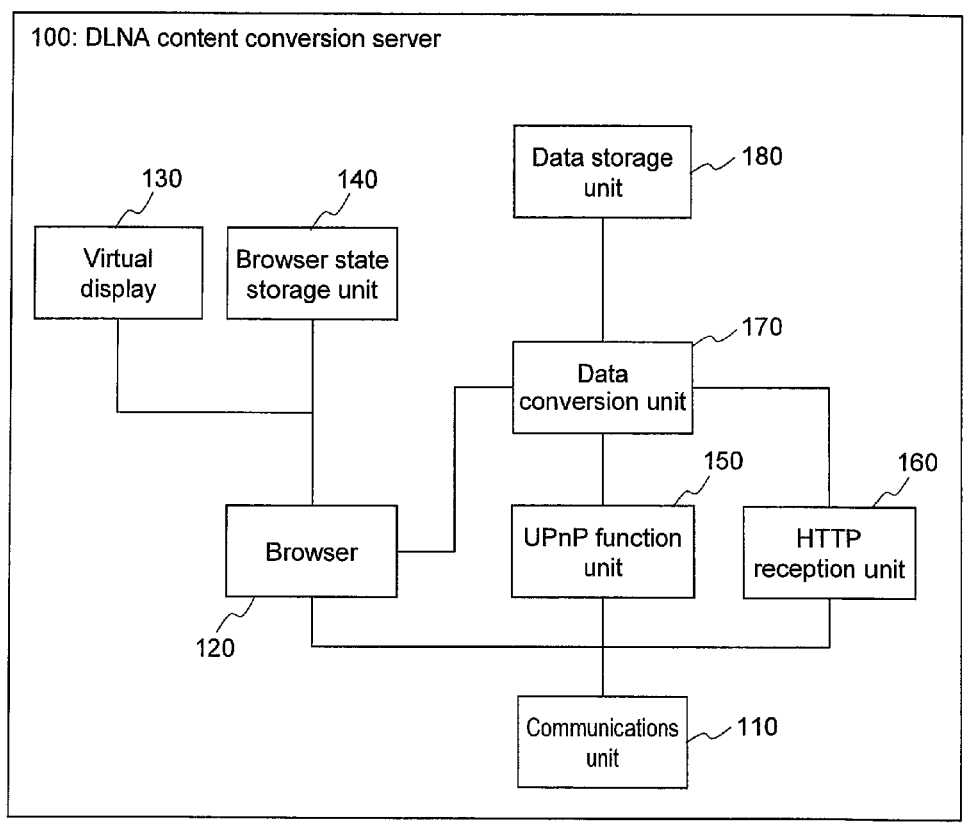
FIG. 2 is a functional block diagram of a DMS 100.

FIG. 2 is a functional block diagram of the DMS 100. The DMS 100 comprises a communications unit 110, a browser unit 120, a virtual display 130, a browser state storage unit 140, a UPnP function unit 150, an HTTP reception unit 160, a data conversion unit 170, and a data storage unit 180.

The communications unit 110 is a network interface that performs IP-based communications with those external to the DMS 100. The browser unit 120 retrieves web content from a web server via the communications unit 110 using HTTP (HyperText Transfer Protocol). Further, it interprets HTML retrieved from a web server.

The virtual display 130 generates an HTML page screen image as the result of HTML, interpretation by the browser unit 120. However, an actual display device need not necessarily be used so long as a screen image can be generated internally.

The browser state storage unit 140 stores changes in screen state caused by such operational instructions as entering text with respect to an HTML page, selecting a SELECT tag option included in a FORM tag, and so forth. By reading a screen state stored on the browser state storage unit 140, the DMS 100 is able to restore the same screen state.

The UPnP function unit 150 communicates with those external to the DMS 100 via the communications unit 110 using UPnP. The DMP 200 is thus able to recognize the DMS 100. Further, the UPnP function unit 150 receives UPnP actions (commands defined in UPnP) transmitted by the DMP 200.

The HTTP reception unit 160 receives, from the DMP 200, HTTP requests for content retrieval. The data conversion unit 170 performs a content conversion process for making web content look like DLNA content held by the DMS 100. The data storage unit 180 stores information created by the data conversion unit 170 through content conversion.

As the HTTP reception unit 160 receives an HTTP request from the DMP 200, the data conversion unit 170 retrieves the corresponding information from the data storage unit 180. If the corresponding information is a browser state ID, a browser screen state is read from the browser state storage unit 140, which the virtual display 130 is then made to render, and that screen image is transmitted to the DMP 200. If the corresponding information is a URL, web content is retrieved using the browser unit 120, and the data thereof is transmitted to the DMP 200. Details of these processes are discussed later.

The browser unit 120, the virtual display 130, the UPnP function unit 150, the HTTP reception unit 160, and the data conversion unit 170 may comprise hardware that realizes these functions, e.g., a circuit device, etc., or they may comprise a processor, such as a CPU (Central Processing Unit), etc., and software that defines its operation. The browser state storage unit 140 and the data storage unit 180 may comprise a storage device such as a hard disk device, etc. These functional units and storage units may be integrated as well.

FIG. 3 is a diagram showing a common structure for DLNA-compliant content held by the DMS 100. DLNA-compliant content has a structure similar to a hierarchical structure of folders in a file system of an OS. This structure will hereinafter be referred to as a folder structure of DLNA content held by the DMS 100.

The folder structure of DLNA content comprises object elements. There are two types of object elements, namely containers and items. Containers correspond to folders in a file system of an OS, and are able to hold a plurality of containers and items therein. Items correspond to files in a file system of an OS, and actual content such as HTML pages, images, videos, etc., are examples of items.

Each item element comprises a resource URI (Uniform Resource Identifier) for retrieving the corresponding content. By accessing the address denoted by the URI, the DMP 200 is able to retrieve actual content.

All containers and items are identified through IDs called ObjectIDs that are unique within the DMS 100. A folder structure of DLNA content always begins with a root container 18001. The objectID of the root container 18001 is fixed at 0. The DMP 200 retrieves a container 18002 or item 18003 generally by going down the folder hierarchy in order from the root container 18001.

As the DMP 200 initially accesses the DMS 100, the DMS 100 transmits to the DMP 200 a list of containers and items held by the root container 18001. By checking the list on the screen of the DMP 200, and further selecting a container on the screen to go down deeper, or selecting an item on the screen to play it, and so forth, the user of the DMP 200 plays DLNA content.

DLNA content provided by the DMS 100 comprises such a navigation structure as that shown in FIG. 3, and is unable to provide HyperLinks like HTML pages. Therefore, insofar as it plays DLNA-compliant content, the DMP 200, which is a DLNA-compliant player device, cannot use navigation structures provided by common HTML pages. As such, there needs to be provided a web browser function in addition to the primary function of the DMP 200.

FIG. 4 is a diagram showing a screen display example of an HTML page. As a web browser reads HTML data, the web browser displays a screen such as that in FIG. 4. The web browser displays a page title 13001 at the top portion of the screen, and renders, within the screen, text such as a page heading 13002, etc., and links 13003, etc. As the user clicks on the links 13003 with a pointing device, e.g., a mouse, etc., the web browser retrieves content, such as another HTML page at the link destination, an image, etc., and displays them anew on the screen.

Figure 5:
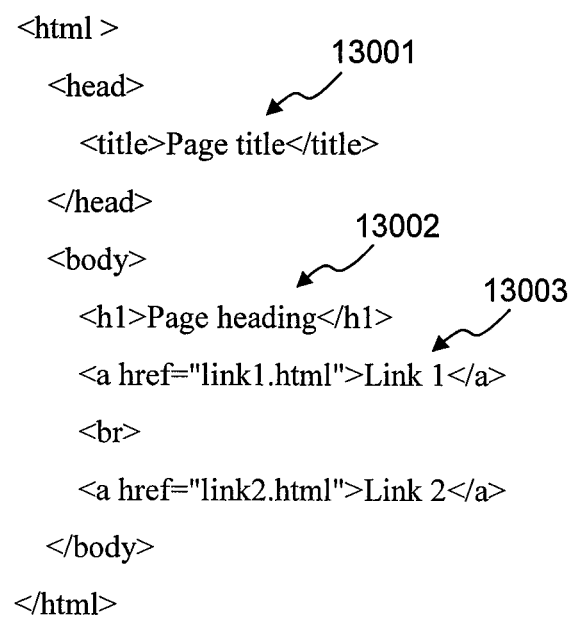
FIG. 5 is a diagram showing HTML source code for the HTML page shown in FIG. 4.

FIG. 5 is a diagram showing HTML source code for the HTML page shown in FIG. 4. The page title 13001, the page heading 13002, and the links 13003 are respectively written using HTML tags such as those shown in FIG. 5.

In playing DLNA-compliant content, the DMP 200 is unable to specify a specific point on the screen, and is only capable of allowing an on-screen selection from a folder structure such as that shown in FIG. 3. Thus, the user of the DMP 200 cannot handle web content in the same way s/he would operate a web browser using a pointing device. By way of example, even if the user wanted to select link 13003, since the DMP 200 is incapable of specifying the desired location on the screen, the user would not be able to select link 13003 on the screen. This presents an obstacle in playing web content such as HTML pages, etc., using a DLNA-compliant player device.

As such, the DMS 100 converts an HTML navigation structure, as represented by links 13003, into a DLNA content navigation structure such as that shown in FIG. 3 by way of example, thereby making it possible to handle, in a simulated fashion, web content as DLNA content. The DMP 200 is thus able to follow, as DLNA content, a navigation structure equivalent to an HTML navigation structure, thereby making it possible to play web content directly with the DMP 200.

Specifically, the DMS 100 converts a navigation structure that links to other content, as in the links 13003, into containers of DLNA content. Since DLNA containers are objects that hold other containers and items therein, it is possible to provide a navigation function similar to the links 13003. In other words, the user is able to play, in a simulated fashion, web content using the DMP 200.

Figure 6:
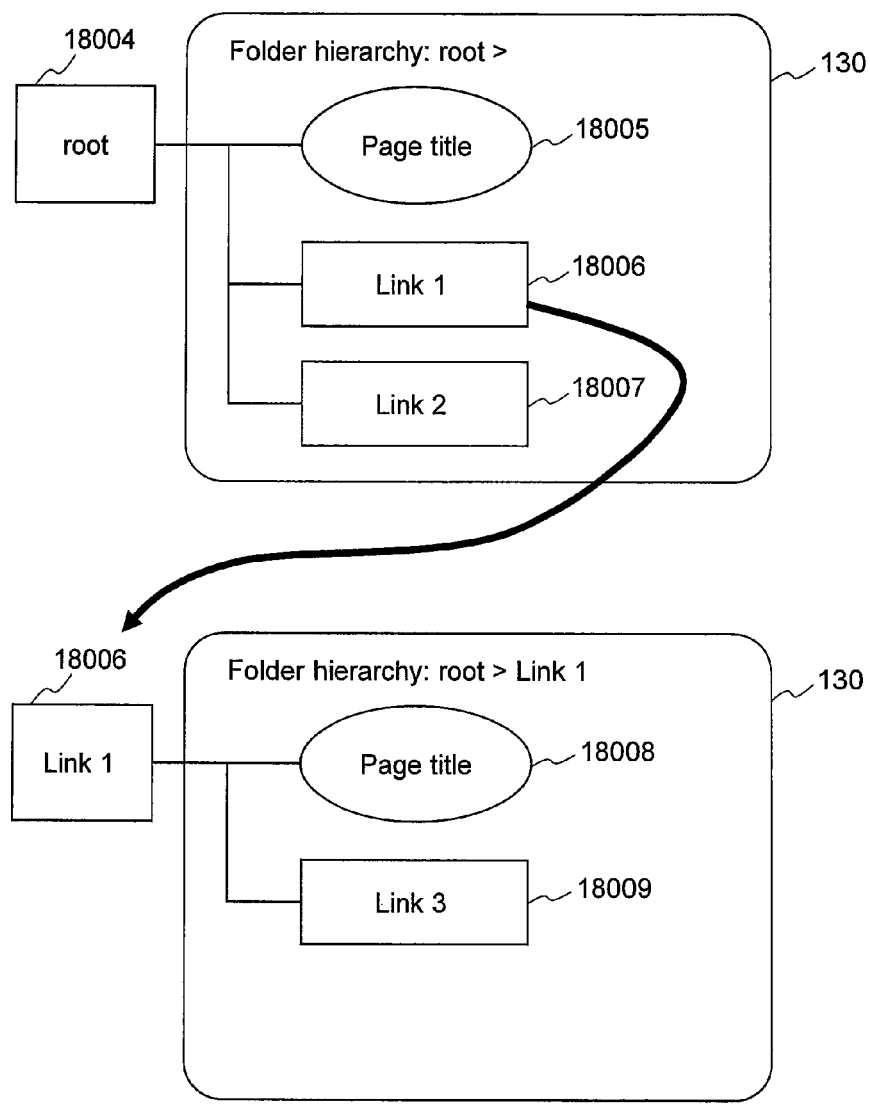
FIG. 6 is a diagram showing how the navigation structure represented by the HTML data illustrated in FIG. 4

FIG. 6 is a diagram showing how a navigation structure represented by the HTML data illustrated in FIG. 4 and FIG. 5 is converted into a DLNA-compliant folder structure. In the description below, this conversion will be referred to as folder structure representation. The data conversion unit 170 converts a navigation structure represented by HTML data, creates a folder structure such as that in FIG. 6, and replies to the DMP 200 with that folder structure. The procedure for the above is as follows.

(FIG. 6: Step 1: Searching a Root Container)

As the user instructs the DMP 200 to search the root container, the DMP 200 accesses the DMS 100, requesting transmission of the content held by the root container 18001. It is assumed here that the HTML page illustrated in FIG. 4 and FIG. 5 is specified as the URI of root container 18001.

(FIG. 6: Step 2: Converting Navigation Within an HTML Page)

The browser unit 120 of the DMS 100 retrieves the HTML page specified by the URI of root container 18001. The data conversion unit 170 converts that HTML data into a folder structure such as that shown in FIG. 6. The folder structure generated by the data conversion unit 170 at this point only represents the navigation structure of the HTML page, and the content of the HTML page is not displayed on the screen. The various objects in FIG. 6 are described below.

(FIG. 6: Step 2: Item)

Item 18005 is an item that is selected when the user wishes to have the content of the HTML page in FIG. 4 and FIG. 5 displayed on the screen. At the time of the initial retrieval of the HTML page, the DMS 100 converts the navigation structure within the HTML page into a folder structure, but does not display the content of the body of the HTML page on the screen. If it is desired that the body of the HTML page be displayed on the screen, the user selects item 18005 on the screen of the DMP 200.

(FIG. 6: Step 2: Item: Additional Note 1)

In creating item 18005, the data conversion unit 170 first stores the ObjectID of item 18005 on the data storage unit 180. The data conversion unit 170 next adds, to the resource URI of item 18005 and as a parameter, information for referencing the ObjectID of item 18005. When the DMP 200 accesses the resource URI of item 18005, the data conversion unit 170 retrieves the HTML page thereof, converts it into a format playable by the DMP 200, and transmits it to the DMP 200. By way of example, since the DMP 200 is generally equipped with a function for playing image data, the browser unit 120 may first render the HTML page on the virtual display 130, and that screen image may be transmitted to the DMP 200.

(FIG. 6: Step 2: Item: Additional Note 2)

The data conversion unit 170 may also generate a screen image of the HTML page on the virtual display 130 at the point when the HTML page is retrieved for the purpose of generating the folder structure shown in FIG. 6 instead of when the DMP 200 plays item 18005, and store that screen image on the browser state storage unit 140 in advance. In this case, the screen image and the ID thereof are stored on the browser state storage unit 140, and the ObjectID of item 18005 and the ID of the screen image are mapped to each other and stored on the data storage unit 180. By generating the screen image in advance, in the event that the DMP 200 requests retrieval of the HTML page corresponding to item 18005, the DMS 100 would be able to promptly send a reply to the DMP 200 with that HTML page.

(FIG. 6: Step 2: Item: Additional Note 3)

The data conversion unit 170 does not necessarily have to store the result of rendering the HTML page on the virtual display 130, and may, by way of example, store comparable information on the browser state storage unit 140, reading and rendering it when it later becomes needed. What kind of information is to be stored on the browser state storage unit 140 as browser states may vary depending on the rendering function, etc., that the DMP 200 has, but it is speculated that, in general, the DMP 200 should in many cases be able to play as long as a screen image is stored.

(FIG. 6: Step 2: Container)

Containers 18006 and 18007 are obtained by respectively converting links 13003 in FIG. 5 into containers. Links 13003 are HTML tags that provide a navigation function with respect to other content such as other HTML pages, etc. As such, an arrangement has been made whereby they are converted into containers that similarly provide a navigation function with respect to other DLNA objects, and a navigation function similar to links is provided in a simulated fashion on DLNA contents.

(FIG. 6: Step 2: Container: Additional Note)

Upon retrieval of an HTML page, the data conversion unit 170 parses the HTML source code thereof, looks for descriptions linking to other files, e.g., HTML anchor tags, JavaScript window.open functions, etc., and converts them to containers. When a container of a link is created, the ObjectID of the created container and the URL of its link destination are stored on the data storage unit 180.

(FIG. 6: Step 3: Selecting a Container)

As the DMP 200 accesses container 18006, the data conversion unit 170 retrieves from the data storage unit 180 the URL corresponding to the ObjectID of container 18006, and carries out a procedure similar to step 2.

(FIG. 6: Step 3: Selecting a Container: Additional Note)

In this step, the user selects a folder (container 18006) on the screen of the DMP 200, thereby delving deeper into the folder. The DMP 200 is thus able to follow HTML page links through the same procedure as that for DLNA content. In other words, the DMP 200 need not be equipped with special functionality for browsing HTML pages, and it only has to play DLNA content in accordance with the navigation structure converted by the DMS 100.

Figure 7:
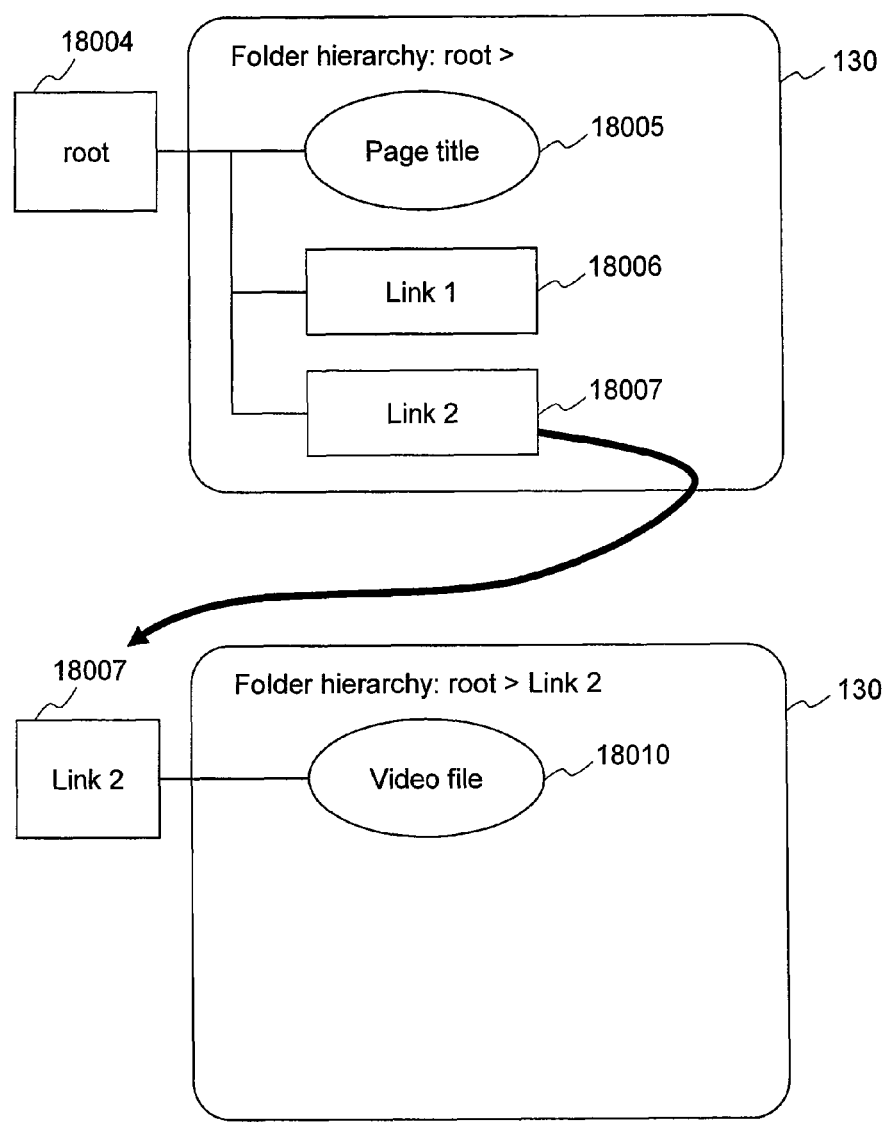
FIG. 7 is a diagram showing a folder structure for a case where the link destination of link 13003 is not an HTML

FIG. 7 is a diagram showing a folder structure for a case where the link destination of link 13003 is not an HTML file. If a link destination file retrieved from the URL corresponding to the ObjectID of a container is not an HTML page, the data conversion unit 170 of the DMS 100 only has to provide the navigation structure required to play that file, and therefore generates a single item and replies to the DMP 200 therewith. By way of example, if the link destination is a video file, upon selection of item 18010 in FIG. 7 by the DMP 200, the DMP 200 plays that video file. The procedure carried out by the DMP 200 in such a case is as follows.

(FIG. 7: Step 1: Selecting Container 18007)

The user of the DMP 200 selects container 18007 on the screen of the DMP 200.

(FIG. 7: Step 2: Creating Item 18010)

The data conversion unit 170 retrieves the file type of the link destination file for container 18007, and, if it is not an HTML page, creates item 18010 for playing this file. In creating item 18010, the data conversion unit 170 stores on the data storage unit 180 the ObjectID of item 18010 and the URL of the link destination file, and adds, as a parameter, this ObjectID to the resource URI of item 18010.

(FIG. 7: Step 3: Selecting Item 18010)

As the DMP 200 accesses this resource URI, if the link destination file is a file that is ordinarily handled as content in DLNA, e.g., an image file, etc., the data conversion unit 170 retrieves the file from the link destination URL, and transmits the retrieved file to the DMP 200 as is. If the link destination file is a file that is not handled as content in DLNA, e.g., an archive, etc., the data conversion unit 170 creates content that serves as a notification that the file is of a format not supported by DLNA, and sends a reply to the DMP 200 therewith.

Figure 8:
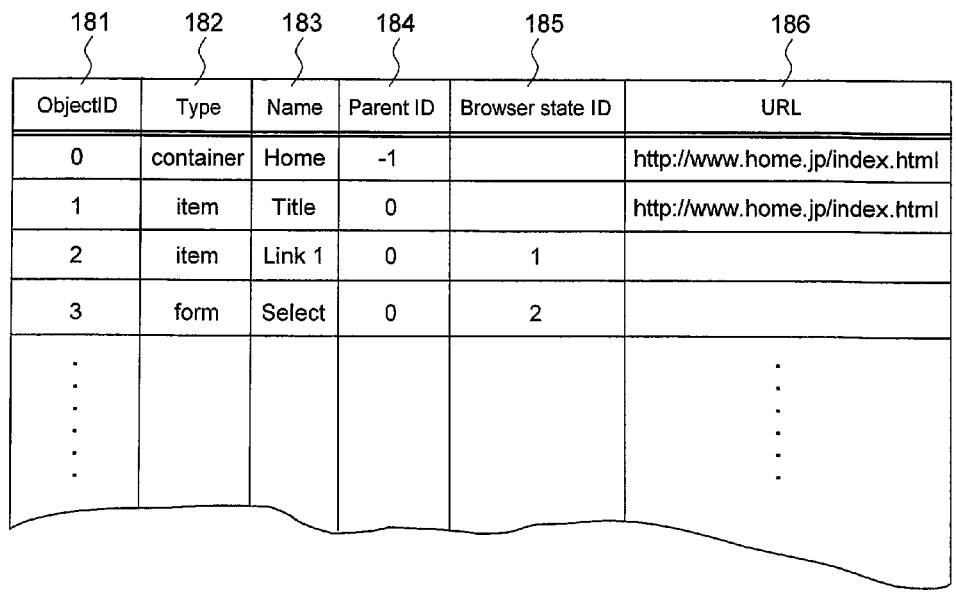
FIG. 8 is a diagram showing the structure and data examples of a data table stored on a data storage unit 180

FIG. 8 is a diagram showing the structure and data examples of a data table stored on the data storage unit 180. The data storage unit 180 stores ObjectID field 181, type field 182, name field 183, parent ID field 184, browser state ID field 185, and URL field 186.

ObjectID field 181 holds objectIDs for identifying objects in a DLNA folder structure generated by the data conversion unit 170. The objectIDs held by this field serve as keys for identifying the respective records stored on the data storage unit 180.

Type field 182 holds values denoting the data types of the objects identified by the values in ObjectID field 181. There are three object types, namely, container, item, and form. Name field 183 holds the names of the objects identified by the values in ObjectID field 181. The values in this field serve as names to be assigned to the respective DLNA objects when the DMP 200 displays the folder structure on its screen.

Parent ID field 184 holds the ObjectIDs of the respective parent containers of the objects identified by the values in ObjectID field 181.

Browser state ID field 185 holds identifiers of screen images stored on the browser state storage unit 140. Specifically, if the value in type field 182 is "form," or if the value in type field 182 is "item" and the link destination thereof is not an HTML page, the value in this field becomes necessary since a screen image is created. Forms will be discussed later in connection with Embodiment 2.

URL field 186 holds link destination URLs for when the DMP 200 selects an object. Specifically, if the value in type field 182 is "container," or if the value in type field 182 is "item" and the link destination thereof is not an HTML page, the value in this field becomes necessary since the DMP 200 retrieves the link destination file.

Figure 9:
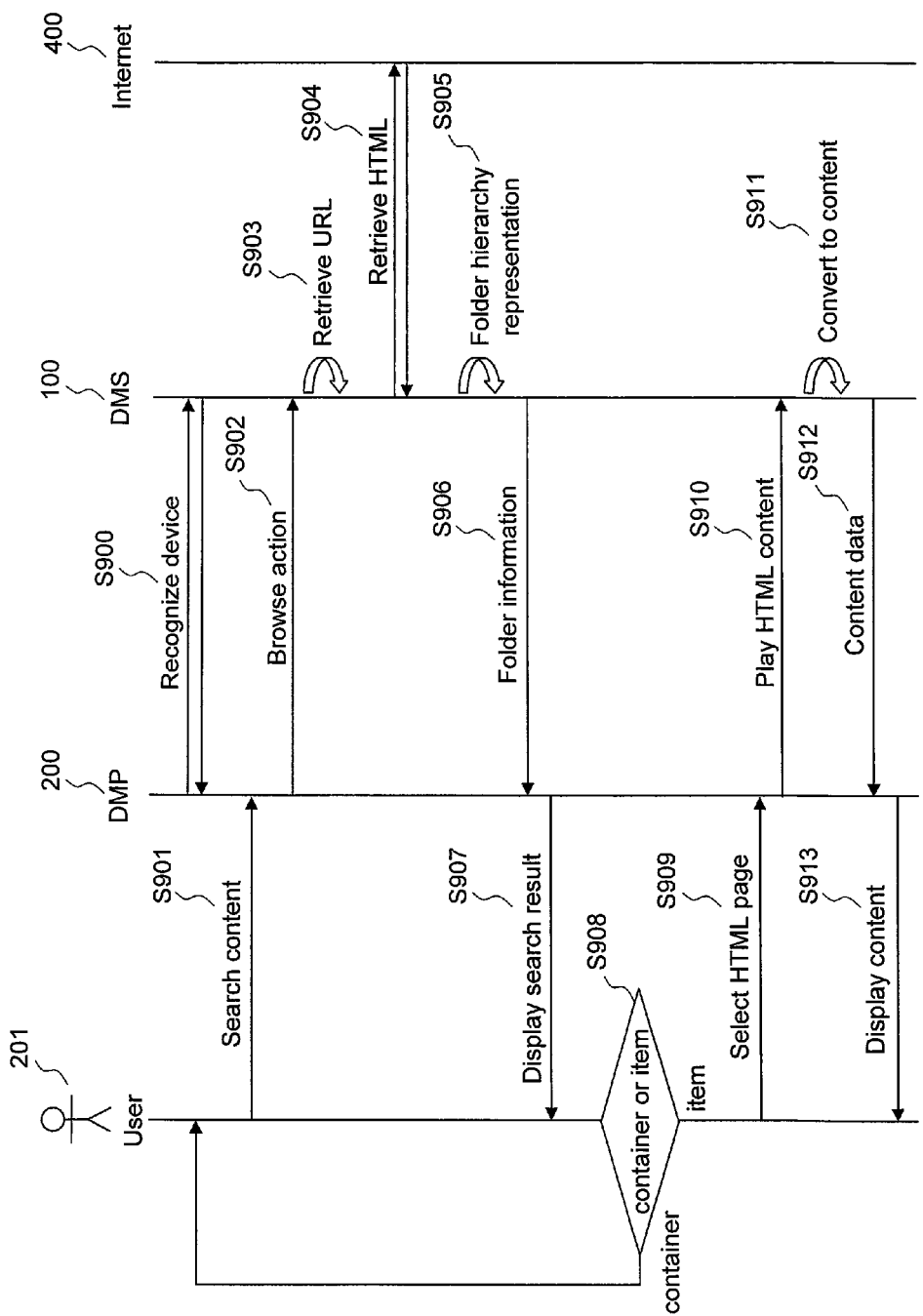
FIG. 9 is a sequence diagram showing operations of the DLNA browsing system 1000.

FIG. 9 is a sequence diagram showing operations of the DLNA browsing system 1000. Here, it is assumed that user 201 accesses the DMS 100 using the DMP 200, and browses web content in the external network 400. Each step in FIG. 9 is described below.

(FIG. 9: Step S900)

Prior to user 201's use of the DMP 200, the DMP 200 carries out device recognition. This is a procedure for detecting the presence of the DMS 100 within the network, and is carried out through the UPnP discovery mechanism. Through this step, the DMP 200 is able to recognize the DMS 100 and indicate its presence to user 201.

(FIG. 9: Step S901)

User 201 operates the DMP 200 with a remote control, etc., and carries out a content search. The expression "content search" as used above refers to a request to retrieve a list of objects held by a container.

(FIG. 9: Step S902)

Upon reception of an instruction from the user in step S901, the DMP 200 sends a Browse action to the DMS 100. A Browse action is a request for retrieving a list of objects within a container and is defined in DLNA.

(FIG. 9: Step S903)

The HTTP reception unit 160 of the DMS 100 receives the Browse action from the DMP 200. The data conversion unit 170 retrieves the ObjectID of the container that is the target of the Browse action. With that ObjectID as a key, the data conversion unit 170 next retrieves, from the data table stored on the data storage unit 180, the URL corresponding to the container that is the target of the Browse action.

(FIG. 9: Step S904)

The data conversion unit 170 retrieves web content from the URL retrieved in step S903. Here, it is assumed that an HTML page is retrieved.

(FIG. 9: Step S905)

The data conversion unit 170 parses the navigation structure represented by the HTML data retrieved in step S904, converts it into a DLNA content folder structure having the same navigation structure thereas, and sends a reply to the DMP 200. This step corresponds to a process of converting the HTML page shown in FIG. 4 and FIG. 5 by way of example into a folder structure such as that in FIG. 6.

(FIG. 9: Steps S906-S907)

The data conversion unit 170 replies with information representing the folder structure created in step S905 as a response to the Browse action in step S902 (S906). The DMP 200 interprets the folder structure transmitted by the DMS 100 as DLNA content that the DMS 100 holds, and displays the folder structure thereof on the screen. As a result, user 201 is able to browse, as a DLNA content folder structure, a navigation structure that is equivalent to that represented by the HTML page (S907).

(FIG. 9: Step S908)

User 201 follows the folder structure displayed by the DMP 200 on its screen, and views web content as DLNA content. If the user selects a container on the DMP 200, the process returns to step S901 and similar steps are repeated. If the user selects an item on the DMP 200, the DMS 100 retrieves the file at the link destination thereof and transmits it to the DMP 200. Here, it is assumed that the user selects navigation to the body of an HTML page such as item 18005 described in connection with FIG. 6 and FIG. 7. The process for a case where an item that links to something other than an HTML page is selected will be described later in connection with FIG. 10.

(FIG. 9: Step S909)

The user selects, on the screen of the DMP 200, an item that links to an HTML page.

(FIG. 9: Step S910)

By specifying the ObjectID of the item selected by the user, the DMP 200 issues a request for browsing the content thereof to the DMS 100. This request is issued as a request to play HTML content, where an HTML page is treated as DLNA content.

(FIG. 9: Step S911)

The HTTP reception unit 160 of the DMS 100 receives the request to play HTML content from the DMP 200. The browser unit 120 renders on the virtual display 130 the HTML page pre-retrieved in step S904, and generates a screen image in a format that is playable by the DMP 200.

(FIG. 9: Steps S912-S913)

The data conversion unit 170 replies to the DMP 200 with the screen image created by the browser unit 120 as a response to the request in step S910 (S912). The DMP 200 displays the received screen image on its screen. Thus, the user is able to browse the HTML page on the screen of the DMP 200 (S913).

Figure 10:
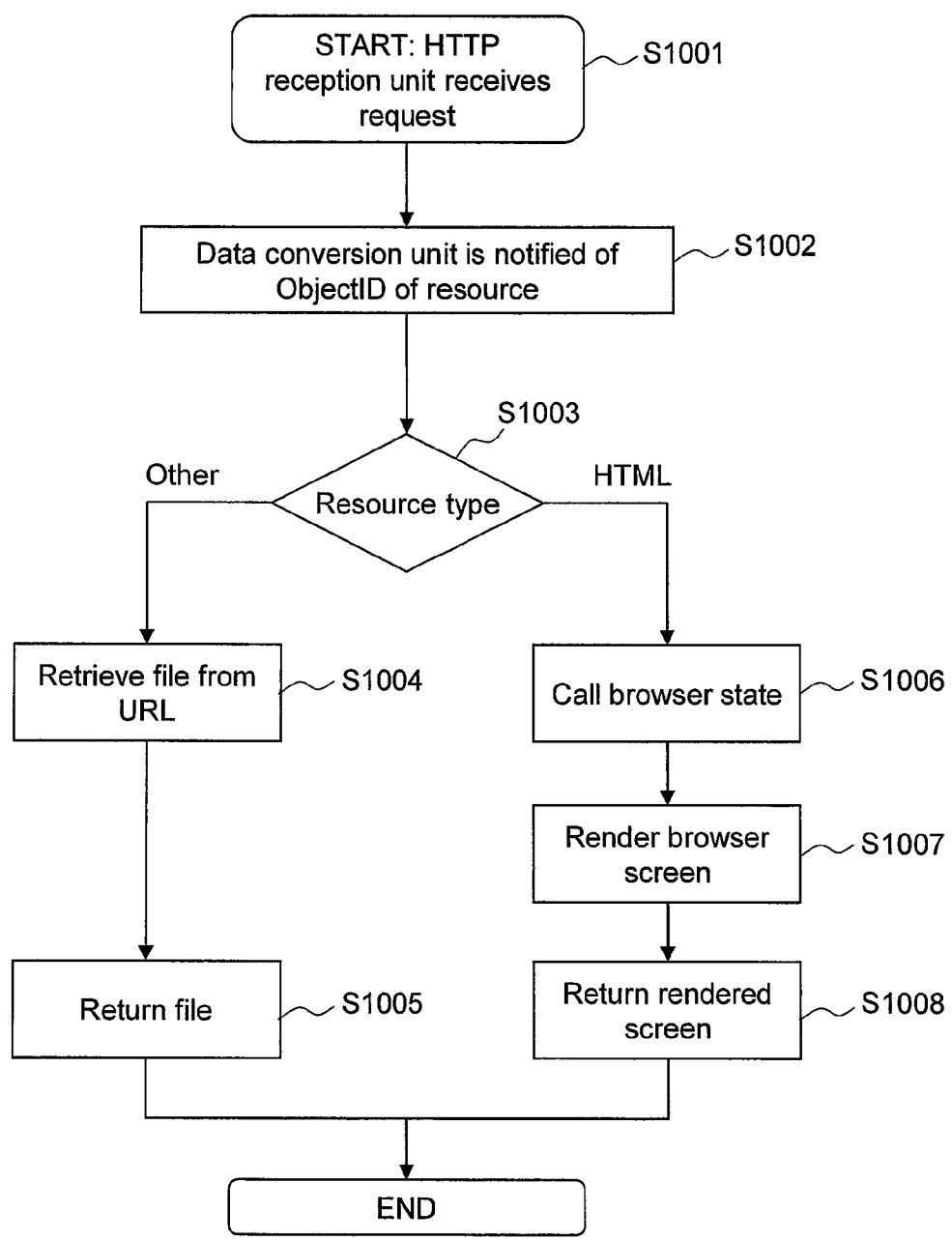
FIG. 10 is a diagram showing a process flow for when the DMS 100 has received a content retrieval request from a DMP 200.

FIG. 10 is a diagram showing a process flow for when the DMS 100 has received a content retrieval request from the DMP 200. This process flow corresponds to the process carried out by the DMS 100 in steps S910-S911 in FIG. 9. Each step in FIG. 10 is described below.

(FIG. 10: Step S1001)

Once a content retrieval request issued by the DMP 200 is received by the HTTP reception unit 160 of the DMS 100, the present process flow is started.

(FIG. 10: Step S1002)

The HTTP reception unit 160 retrieves the ObjectID of the object specified by the request received in step S1001, and notifies the data conversion unit 170 of it. By way of example, the ObjectID may be specified with respect to the DMS 100 as a request parameter when the DMP 200 issues the request, or the DMS 100 may be notified of it by any other given method.

(FIG. 10: Step S1003)

With the ObjectID received in step S1002 as a key, the data conversion unit 170 searches a data table stored on the data storage unit 180 and retrieves the corresponding record. If the retrieved record is data regarding an item that links to an HTML page, the process proceeds to step S1006, whereas if not, the process proceeds to step S1004.

(FIG. 10: Step S1003: Additional Note)

If there exists a value in browser state ID field 185 corresponding to the ObjectID received in step S1002, this would signify that the item denoted by this ObjectID is an item that links to an HTML page. Accordingly, in this case, the process would proceed to step S1006 after this step. If there is no value in browser state ID field 185 corresponding to the ObjectID and there only exists a value in URL field 186, this would signify that the item denoted by this ObjectID is an item that links to a file that is not an HTML page.

(FIG. 10: Steps S1004-S1005)

The data conversion unit 170 retrieves a file from the URL corresponding to the ObjectID received in step S1002 (S1004). The data conversion unit 170 converts that file into a format playable by the DMP 200 if necessary, and transmits it as DLNA content (S1005).

(FIG. 10: Step S1006)

With the value of browser state ID field 185 corresponding to the ObjectID received in step S1002 as a key, the data conversion unit 170 reads the screen image of the HTML page from the browser state storage unit 140.

(FIG. 10: Step S1007)

If information other than a screen image is stored on the browser state storage unit 140, the browser unit 120 renders the HTML page on the virtual display 130 to generate a screen image.

(FIG. 10: Step S1008)

The data conversion unit 170 transmits the screen image of the HTML page to the DMP 200.

FIG. 11 is a diagram showing an example of data representing a folder structure created when the data conversion unit 170 receives a Browse action from the DMP 200. This data is written in DIDL-Lite (Digital Item Declaration Language Lite) format. DIDL-Lite is a format based on XML (Extensible Markup Language), and is used as information representing configuration information of content held by DMSs. The data shown in FIG. 11 by way of example is DIDL-Lite written to represent the HTML page in FIG. 5 as a folder structure. This data corresponds to DIDL-Lite that the data conversion unit 170 creates when the DMS 100 receives a Browse action that specifies the ObjectID of container 18004 in FIG. 6 and in which the BrowseFlag is set to BrowseDirectChildren.

The first element, 17001, is an element denoting the fact that the document type is DIDL-Lite, and is a fixed element.

Element 17002 is an element representing item 18005 in FIG. 6. Element 17002 comprises id attribute 17003, parentID attribute 17004, and restricted attribute 17005. It further comprises, as child elements, dc:title element 17006, upnp:class element 17007, and res element 17008. All attributes and child elements except for res element 17008 are common to both item elements and container elements, and are required.

The id attribute denotes the ObjectID of an item. The parentID attribute denotes the ObjectID of the parent container of this item. The restricted attribute denotes whether or not alteration of this object from outside is restricted.

The dc:title element is the name of this object. Since item 18005 is an item that refers to an HTML page, the value of dc:title element 17006 would be the title of the HTML page. In the case of an item for referencing a file other than an HTML page, as in item 18010, the title of container 18007, which is the name of the link to the file, may be used for the dc:title element.

The upnp:class element is information denoting the object's type. The value "object.item.imageItem" specified by upnp:class element 17007 denotes the fact that the item in question is an image. Item 18005 is an item for viewing an HTML page, but since it is assumed that HTML pages are converted into screen images, this element indicates that the item in question is an image. By way of example, in the case of a video file, as in item 18010, the value of this element would be "object.item.videoItem".

The res element is a child element particular to item elements, and denotes the resource URI for accessing the file indicated by this item. Res element 17008 comprises protocolInfo attribute 17009. ProtocolInfo attribute 17009 denotes the resource's type. URI 17010, which is the value of res element 17008, is obtained by adding, to the URL for accessing the relevant HTML page and as a request parameter, the ObjectID of item 18005.

Element 17011 is an element representing container 18006 in FIG. 6. With respect to container elements, too, the id attribute, the parentID attribute, the restricted attribute, the dc:title element, and the upnp:class element are required.

For the id attribute, since a different value must be used for every object, id attribute 17012 of element 17011 differs from id attribute 17003 of element 17002. ParentID attribute 17013 is the same as parentID attribute 17004 of element 17002.

Since element 17011 is a container representing link 13003, dc:title element 17014 is the link name of link 13003. Upnp:class element 17015 is "object.item.container", which is a value denoting the fact that it is a container.

<Embodiment 1: Summary>

Thus, the DLNA content conversion device 100 according to Embodiment 1 converts a navigation structure written in HTML into a DLNA content navigation structure having the same structure. Accordingly, it is possible to browse HTML pages as DLNA content even with the DMP 200, which is not equipped with a function for browsing HTML pages.

Further, upon reception of a Browse action with respect to an HTML page linked to a container, the DLNA content conversion device 100 according to Embodiment 1, instead of replying with that HTML page as is, parses the navigation structure represented by that HTML page, converts it into a folder structure, and replies to the DMP 200 therewith as information such as that in FIG. 6 and FIG. 7. The user is thus able to browse HTML pages on the screen of the DMP 200 through an operation procedure similar to navigation that is ordinarily provided when browsing DLNA content.

Further, the DLNA content conversion device 100 according to Embodiment 1 replies by converting web content, e.g., HTML pages, video files, etc., into formats playable by the DMP 200. It is thus possible for the DMP 200 to reliably play HTML pages not only from the perspective of navigation structure, but also from the perspective of file format.

<Embodiment 2>

In Embodiment 1, a description was provided with respect to converting navigation tags that link to other HTML pages, as in HTML anchor tags, etc., into DLNA content containers. On the other hand, in cases where a form tag is included within an HTML page, the web browser transmits to a web server parameters included in the form tag, and displays a response thereto on the screen. From the perspective that a transition takes place from the HTML page in which the form tag is written to a response page thereof, it may be said that link-like navigation takes place in this process.

As such, in Embodiment 2 of the present invention, a description is provided with respect to an operation example in which an HTML form tag is converted into a DLNA content container as in Embodiment 1. Since the various features of the DLNA browsing system 1000 are similar to those in Embodiment 1, the description provided below will revolve mainly around differences concerning form tags.

Figure 12:
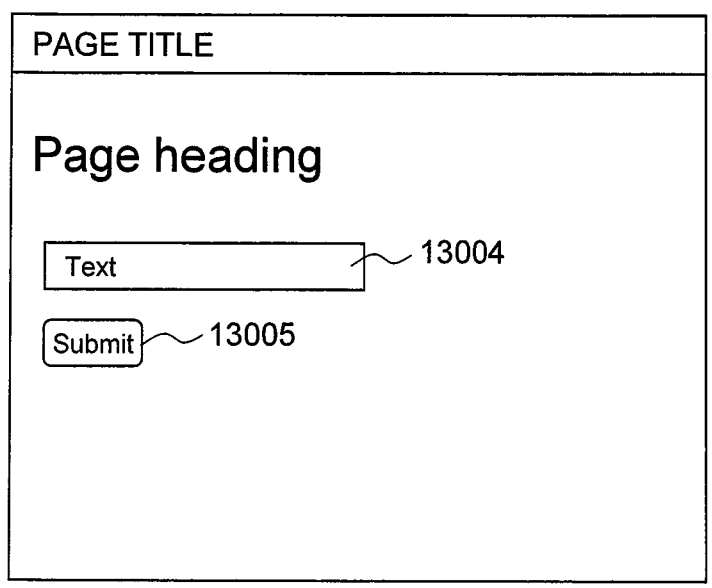
FIG. 12 is a diagram showing a screen display example of an HTML page including a form.

FIG. 12 is a diagram showing a screen display example of an HTML page including a form. HTML allows the use of tags called forms as a means for transmitting information from a page user to a web server. In the example in FIG. 12, text box 13004 for entering text, and submit button 13005 for instructing that the text string entered into text box 13004 be transmitted to the web server are displayed on the screen.

FIG. 13 is a diagram showing HTML source code for the HTML page shown in FIG. 12. Input tag 13006 corresponds to text box 13004 in FIG. 12, and input tag 13007 to submit button 13005 in FIG. 12.

The type of an element included in a form tag is determined by the value of the type attribute of the input tag. The type attribute of input tag 13006 is "text," indicating that the tag is a text box. The type attribute of input tag 13007 is "submit," indicating that the tag is a submit button.

In addition to the above, form tags may comprise input tags whose type attribute is checkbox, radio, select, or password. Such differences in type attribute are reflected in the HTML page as differences in the type of on-screen components used by the user to input parameters to the form tag. These attributes will be described later in connection with Embodiment 3.

FIG. 14 is a diagram showing a folder structure representation of the HTML page in FIG. 13. The data conversion unit 170 converts the input elements that the form tag has into DLNA content containers. The procedure for the above is as follows. Descriptions are partly omitted with respect to steps that are similar to those described in connection with FIG. 6.

(FIG. 14: Step 1: Item 18011)

As with item 18005 in FIG. 6, the data conversion unit 170 creates item 18011 that links to the HTML page itself in FIG. 12, and stores a screen image on the browser state storage unit 140. The data conversion unit 170 stores on the data storage unit 180 the ObjectID and browser state ID of item 18011, and specifies information for referencing this ObjectID as the resource URI for item 18011.

(FIG. 14: Step 2: Container)

The data conversion unit 170 seeks out form tags included in the HTML page, and creates corresponding containers. In the case of the HTML page in FIG. 13, it creates containers 18012 and 18013 as containers corresponding to input tags 13006 and 13007. The data conversion unit 170 stores on the data storage unit 180 the ObjectID and browser state ID of each container as it did when creating item 18011.

(FIG. 14: Step 2: Container: Additional Note)

Although, in Embodiment 1, the browser state of container 18006 corresponding to a link was not stored, it is necessary to store browser states of containers corresponding to form tags. This is because the operational state with respect to a form (e.g., the text string currently entered in a text box) changes every time the user makes some operational input to the form tag, and that operational state cannot be retrieved based on the URL. Details of the process for this step vary depending on the type attribute of the input tag. Examples of operational input with respect to form tags for each type attribute will be, for purposes of convenience, described later in connection with Embodiment 3.

Figure 15:
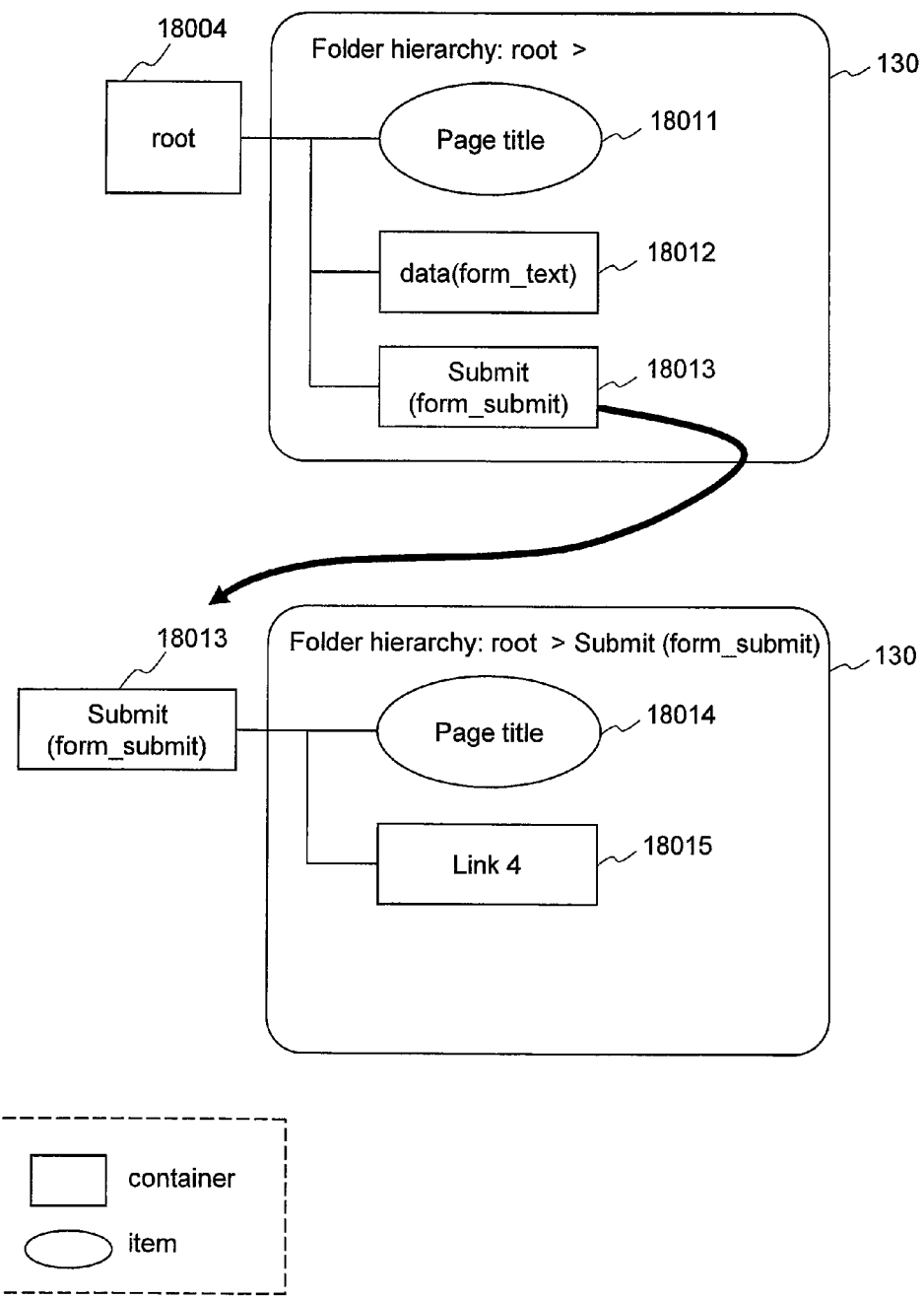
FIG. 15 is a diagram illustrating operations in a case where a screen transition that takes place when a user presses submit button 13005 is realized as DLNA content.

FIG. 15 is a diagram illustrating operations with respect to a case where a screen transition that takes place when the user presses submit button 13005 is realized as DLNA content. As the user presses submit button 13005, the contents of text box 13004 are transmitted to a web server, and a response page thereto is sent back from the web server. As with the links described in connection with FIG. 6 of Embodiment 1, this operation may be seen as a page transition. Thus, a similar navigation structure may be realized using DLNA content containers. The operation for when the DMP 200 selects container 18013 is as follows.

(FIG. 15: Step 1: Selecting a Container)

The user of the DMP 200 selects container 18013 on the screen of the DMP 200. Upon receiving from the DMP 200 a request indicating that container 18013 has been selected, the data conversion unit 170 of the DMS 100 retrieves from the data storage unit 180 the URL corresponding to the ObjectID of container 18013.

(FIG. 15: Step 1: Selecting a Container: Additional Note)

It is assumed that the user has already entered text with respect to the link destination content of container 18012 corresponding to text box 13004. An operation example where text is entered in a text box will be described later in connection with Embodiment 3.

(FIG. 15: Step 2: Retrieving a Post-Form Execution Page)

The data conversion unit 170 retrieves an HTML page corresponding to a response page for when the form has been executed, and replies to the DMP 200 therewith. By way of example, a parameter that the user entered with respect to a program, e.g., CGI (Common Gateway Interface), etc., specified by the action attribute of the form tag is transmitted, and a reply thereto is retrieved.

(FIG. 15: Step 2: Retrieving a Post-Form Execution Page: Additional Note)

If the HTML page is so configured as to perform a screen transition where, instead of making a transition to a new response page, the same page is reloaded, the original HTML page would be re-retrieved in this step. By way of example, if information is simply transmitted without receiving a reply in the form of an HTML, page, or if a button that causes a change in HTML design through JavaScript is pressed, the same page is retrieved again.

(FIG. 15: Step 3: Representing the Post-Form Execution Page as a Folder Structure)

With respect to the HTML page corresponding to a response page for when the form has been executed, the data conversion unit 170 performs a process similar to step 2 for FIG. 6, and replies to the DMP 200 by converting the navigation structure of that HTML page into a folder structure.

<Embodiment 2: Summary>

Thus, the DLNA content conversion device 100 according to Embodiment 2 provides, with respect to a screen transition following the execution of a form tag, navigation based on a folder structure using containers as in Embodiment 1. Accordingly, it is possible to play navigation other than links on the DMP 200.

<Embodiment 3>

In Embodiment 2, a description was provided with respect to an example in which a form tag-based page transition is realized as DLNA content through containers. In Embodiment 3 of the present invention, operation examples are described for each type attribute of input tags representing parameters of form tags. Since the various features in the DLNA browsing system 1000 are similar to those in Embodiments 1 and 2, the description provided below will revolve mainly around operations for each type attribute.

Figure 16:
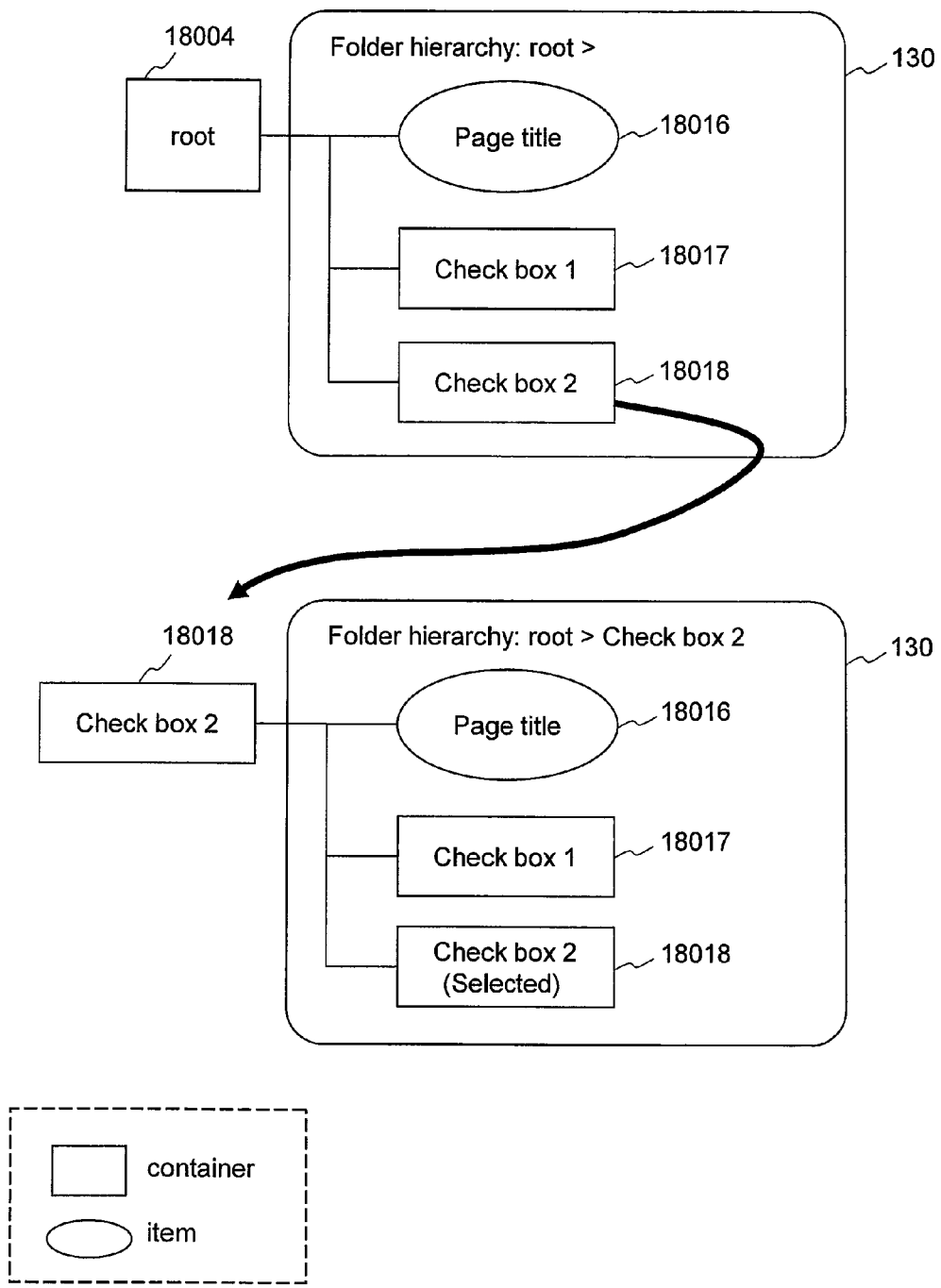
FIG. 16 is a diagram illustrating a screen transition with respect to input elements whose type attribute is checkbox.

FIG. 16 is a diagram illustrating a screen transition with respect to input elements (check boxes) whose type attribute is checkbox. Check boxes are screen components for checking one or more of a plurality of items.

When representing, as a folder structure, an HTML page including checkbox elements, the data conversion unit 170 converts one checkbox element into one container. In FIG. 16, the two check boxes are respectively converted into containers 18017 and 18018.

By way of example, if the DMP 200 selects container 18018, this would signify the fact that the user wishes to check check box 2. The browser unit 120 creates on the virtual display 130 a screen image where check box 2 is checked, and stores that screen image on the browser state storage unit 140.

The data conversion unit 170 next represents the same HTML page as a folder structure again. In so doing, since container 18018 is in a selected state, it would be convenient for the user if information signifying as much were written into the name of container 18018.

Figure 17:
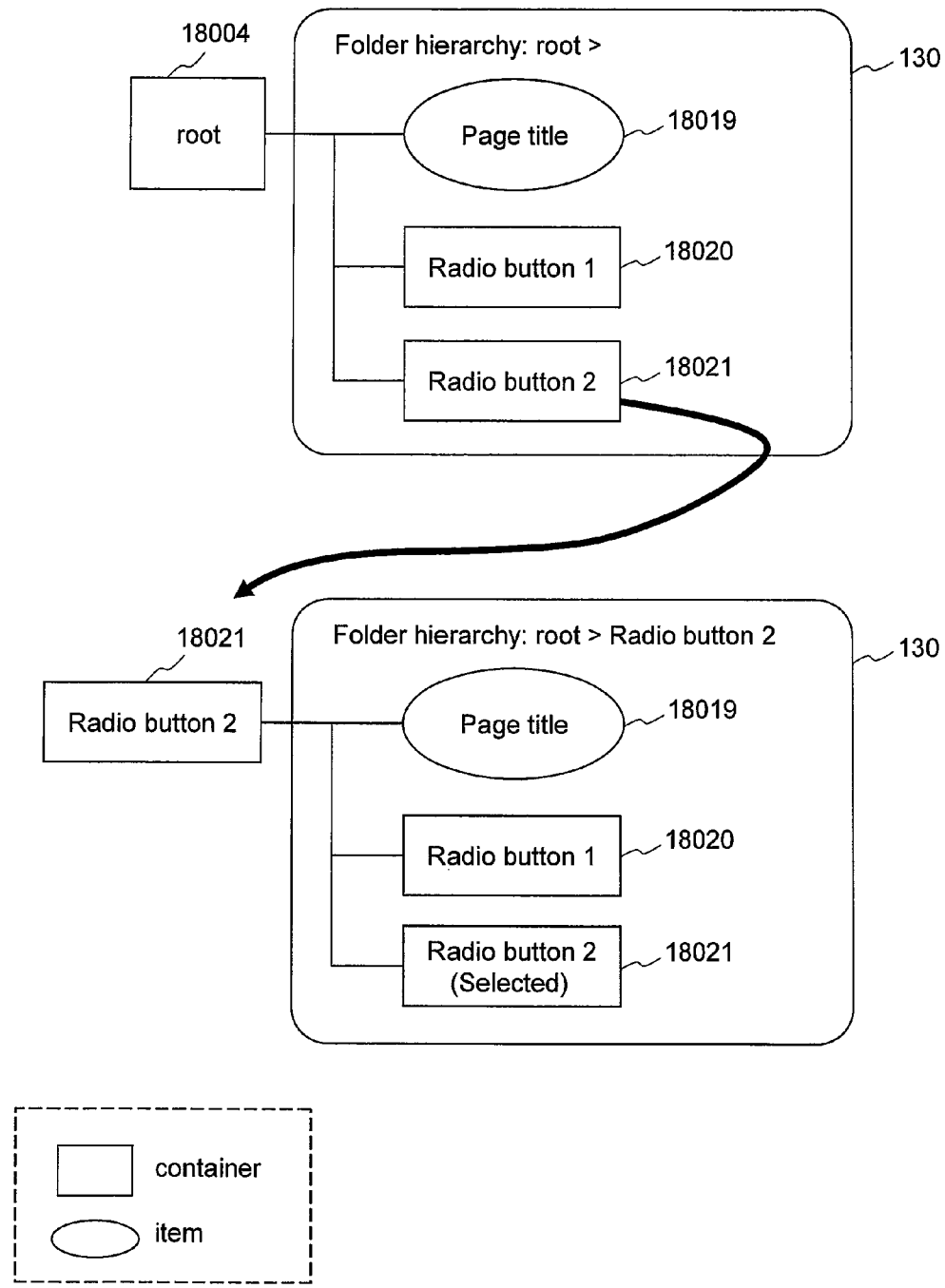
FIG. 17 is a diagram illustrating a screen transition with respect to input elements whose type attribute is radio.

FIG. 17 is a diagram illustrating a screen transition with respect to input elements (radio buttons) whose type attribute is radio. Radio buttons are screen components for selecting one item from among a plurality of items. If a radio button is selected when some other radio button is already selected, the radio button that was selected up to that point is placed in an unselected state.

When representing, as a folder structure, an HTML page including radio elements, the data conversion unit 170 converts one radio button element into one container. In FIG. 17, the two radio buttons are respectively converted into containers 18020 and 18021.

Through a procedure similar to that for converting check boxes into a folder structure, the data conversion unit 170 represents the radio buttons as a folder structure. However, the procedure differs in that, if a given radio button is selected when another radio button is already selected, the selection of the already selected radio button needs to be undone.

Figure 18:
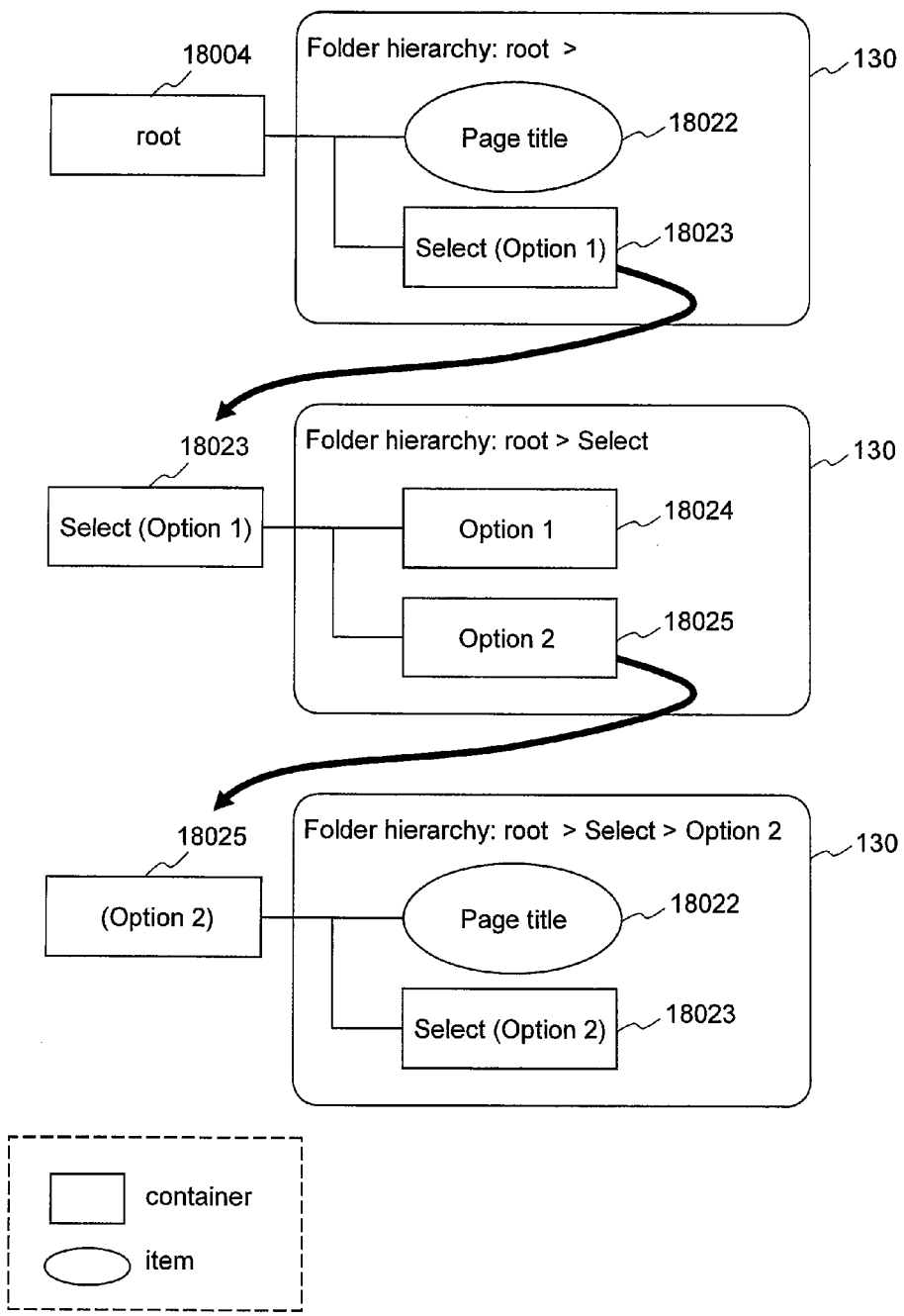
FIG. 18 is a diagram illustrating a screen transition with respect to input elements whose type attribute is select.

FIG. 18 is a diagram illustrating a screen transition with respect to an input element (select) whose type attribute is select. Select elements are screen components for selecting one item from among list items presented in the form of, for example, a pull-down list, etc. With respect to pull-down lists, since the actual options are displayed on the screen only after the options are pulled down, a screen transition takes place in the sense that the displayed content on the screen changes. Further, if the option is changed, a screen state that is different from that for the initially selected option is entered, and a screen transition thus takes place again. Accordingly, in order to convert select elements into a DLNA content navigation structure, unlike the cases above, a two-stage screen transition needs to be expressed through a folder structure.

In FIG. 18, there is shown an example where a select element comprising two options is converted into a folder structure. The select element itself is converted into container 18023, and its options are respectively converted into containers 18024 and 18025. It is assumed that option 1 is initially selected.

If the DMP 200 selects container 18023, this would signify the fact that the user wishes to select an option within the select element. The data conversion unit 170 reads from the HTML page the option elements (corresponding, in this case, to option 1 and option 2) within the select element, and respectively converts these options into containers 18024 and 18025. Since the original HTML page must be returned to after an option has been selected, the original HTML page is specified for the link destination of containers 18024 and 18025.

If the DMP 200 next selects container 18025, this would signify the fact that the user wishes to select option 2 within the select element. The browser unit 120 creates on the virtual display 130 a screen image of a state where option 2 is selected, stores it on the browser state storage unit 140 along with its browser state ID, and further reflects that browser state ID in the record on the data storage unit 180 corresponding to the HTML page.

The data conversion unit 170 next represents the same HTML page as a folder structure again. In so doing, since container 18023 is in a state where option 2 is selected, it would be convenient for the user if information signifying as much were written into the name of container 18023.

Figure 19:
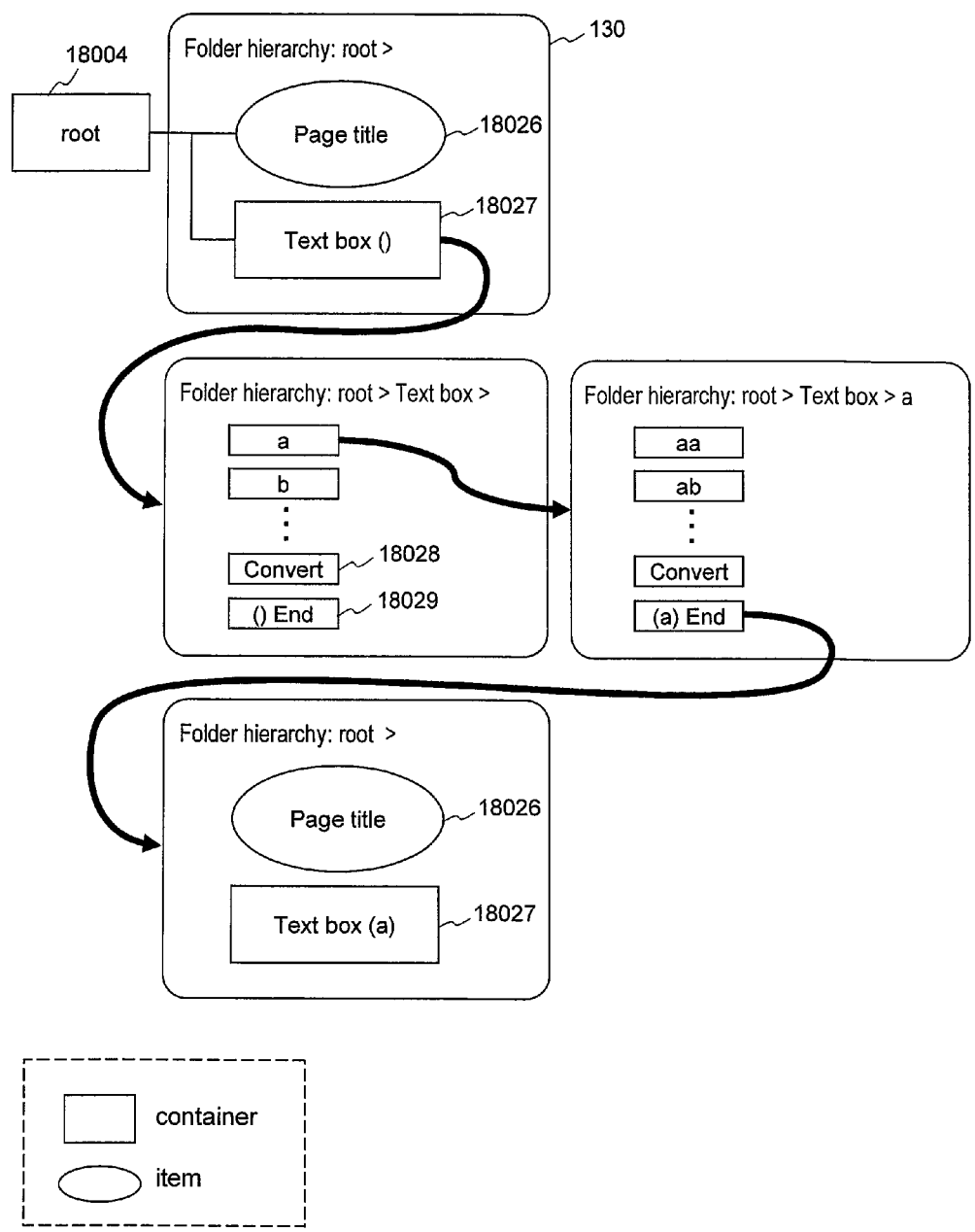
FIG. 19 is a diagram illustrating a screen transition with respect to input elements whose type attribute is text or password.

FIG. 19 is a diagram illustrating a screen transition with respect to an input element (text box or password box) whose type attribute is text or password. Although, with ordinary browsers, text is entered using an input device such as a keyboard, etc., since such devices cannot be used with DLNA content, text is entered by repeatedly selecting containers.

If the DMP 200 selects container 18027, this would signify the fact that the user wishes to enter text into a text box. The data conversion unit 170 creates a plurality of containers respectively corresponding to characters/letters that serve as input candidates. By way of example, if the language is Japanese, containers corresponding to the 50-character hiragana syllabary may be created, whereas if the language is English, containers corresponding to the 26 letters in the alphabet may be created.

The user selects on the screen of the DMP 200 the container corresponding to the character s/he wishes to enter, and the data conversion unit 170 successively stores on the browser state storage unit 140 the characters entered. When performing a kanji conversion, container 18028 equipped with such a function is selected. When ending input, container 18029 for instructing so and returning to the original HTML page is selected.

When returning to the original page, the data conversion unit 170 represents the same HTML page as a folder structure again. In so doing, the characters that have been entered by the user up to that point must be retrieved from the browser state storage unit 140 and reflected in the container 18027.

FIG. 20 is a diagram showing a process flow for when the DMS 100 has received a content search request from the DMP 200. This process flow corresponds to the process performed by the DMS 100 in steps S901 and S902 in FIG. 9.

A Browse action mainly specifies the ObjectID of the element of interest through a parameter called id, and specifies the type of information desired through a parameter called BrowseFlag. There are two types of BrowseFlags, namely, BrowseMetadata, which retrieves information of the element identified by an ObjectID, and BrowseDirectChildren, which retrieves information of an element included in the element identified by an ObjectID. Upon receiving this action, the UPnP function unit 150 of the conversion DMS 100 notifies the data conversion unit 170 of the ObjectID and BrowseFlag. The data conversion unit 170 activates the process in FIG. 20. Each step in FIG. 20 is described below.

(FIG. 20: Step S2001)
Once the data conversion unit 170 is notified of a Browse action, the present process flow is started.

(FIG. 20: Step S2002)
If the notified ObjectID is stored on the data storage unit 180, the process proceeds to step S2003, whereas if not, an error notification is sent and the present process flow is terminated.

(FIG. 20: Step S2003)
The data conversion unit 170 checks the value of the BrowseFlag parameter of the Browse action. If the BrowseFlag parameter is BrowseMetadata, the process proceeds to step S2004, whereas if it is BrowseDirectChildren, the process proceeds to step S2005.

(FIG. 20: Step S2004)
The data conversion unit 170 retrieves, from the data storage unit 180, name field 183 and parent ID field 184 corresponding to the ObjectID, and returns the information.

(FIG. 20: Step S2005)
The data conversion unit 170 retrieves from the data storage unit 180 the value of type field 182 corresponding to the notified ObjectID to determine whether or not it is a container. The process proceeds to step S2006 if it is a container, or to step S2012 if not.

(FIG. 20: Step S2006)
The data conversion unit 170 retrieves file information from URL field 186 stored on the data storage unit 180.

(FIG. 20: Step S2007)
The data conversion unit 170 checks whether or not the file indicated by the URL is an HTML file. The process proceeds to step S2009 if it is an HTML file, or to step S2008 if not.

(FIG. 20: Step S2008)
The data conversion unit 170 creates an item (e.g., item 18010 in FIG. 7) corresponding to the file, registers it in the data storage unit 180, and returns the information.

(FIG. 20: Steps S2009-S2010)
The data conversion unit 170 retrieves the file from the URL (S2009). The browser unit 120 next renders the retrieved HTML file on the virtual display 130, and stores that screen image on the browser state storage unit 140 (S2010).

(FIG. 20: Step S2011)
The data conversion unit 170 represents, as a folder structure, the HTML page rendered by the browser unit 120, and returns that information. Further, information on the created items and containers are stored on the data storage unit 180.

(FIG. 20: Step S2012)
The data conversion unit 170 checks whether or not the value of type field 182 retrieved in step S2005 is item. The process proceeds to step S2013 if the value of type field 182 is item, or to step S2014 if not (FIG. 20: Step S2013)
With the folder structure of DMS 100, since items and containers are not contained within items, there would be no information corresponding to BrowseDirectChildren even if the value of type field 182 were item in step S2012. Accordingly, the data conversion unit 170 returns empty information.

(FIG. 20: Steps S2014-S2015)
The data conversion unit 170 determines that the ObjectID's type is form (S2014). The data conversion unit 170 retrieves from the data storage unit 180 the value of browser state ID field 185 corresponding to the ObjectID, and reads from the browser state storage unit 140 the corresponding browser state (screen image) (S2015).

(FIG. 20: Step S2016)
The data conversion unit 170 checks the browser state retrieved in step S2015 to determine whether or not an operation that causes the screen state to change is being performed, e.g., a select element being selected, a text string being entered in text, and so forth. An operation that causes the screen state to change corresponds to an operation where a container is being selected. The process proceeds to step S2017 if an operation that causes the screen state to change is being performed, or to step S2019 if not.

(FIG. 20: Step S2017)
The data conversion unit 170 checks the browser state, and determines the container that is to be the next option. The term "next option" may refer to an option of a select element if a select element is being manipulated, or to a character that is the next input candidate if a text box or password box is being manipulated.

(FIG. 20: Step S2018)
The data conversion unit 170 represents the option determined in step S2017 as a folder structure, and returns that information.

(FIG. 20: Step S2019)
The data conversion unit 170 searches the browser state, and performs a process corresponding to the element corresponding to the selected ObjectID. By way of example, if the element corresponding to the selected ObjectID is a button, the process in the present step would be to press that button. If the corresponding element is a check box, the process in the present step would be to check that element. If the corresponding process cannot be determined, an onclick event may be caused with respect to that element as an alternative.

(FIG. 20: Steps S2020-S2021)
The data conversion unit 170 stores on the browser state storage unit 140 the screen state as it stands after step S2019 has been performed (S2020). The data conversion unit 170 represents, as a folder structure, the state of the HTML, page rendered by the browser unit 120, and returns that information (S2021).

<Embodiment 3: Summary>

Thus, in Embodiment 3, for each type attribute of input tags under form tags, a procedure for realizing, as DLNA content and in a simulated fashion, an HTML navigation structure by means of a folder structure using containers and items has been described.

List of Reference Numerals
100: DLNA content conversion server (DMS)
110: Communications unit
120: Browser unit
130: Virtual display
140: Browser state storage unit
150: UPnP function unit
160: HTTP reception unit
170: Data conversion unit
180: Data storage unit
181: ObjectID field
182: Type field
183: Name field
184: Parent ID field
185: Browser state ID field
186: URL field
200: DLNA-compliant player (DMP)
300: Router
400: External network
1000: DLNA browsing system

What is claimed is:

1. A DLNA (Digital Living Network Alliance) content conversion device comprising:
a data conversion unit adapted to convert a structure of navigation tags represented by HTML (HyperText Markup Language) data into a folder structure on a DLNA server having the same hierarchical structure as a hierarchical structure of the navigation tags;
a communications unit adapted to communicate with a DLNA client and a web server, wherein
upon receiving, from the DLNA client, a Browse request requesting transmission of a list of content held by a root container, the communication unit retrieves the HTML data that the web server holds,
the data conversion unit converts a structure of navigation tags represented by the HTML data retrieved from the web server by the communication unit into the folder structure on the DLNA server,
the data conversion unit sends a reply to the DLNA client with, as the list of content held by the root container, a navigation item linked to the HTML data retrieved from the web server by the communication unit and the folder structure obtained by converting the structure of the navigation tags,
the data conversions unit converts, into a folder in the folder structure, a link tag describing a link to another file on the web server,
the communication unit receives a Browse request to transmit a list of contents stored in the folder converted by the data conversion unit from the link tag,
the communications unit retrieves, from the web serve, link destination data that is a link destination of the link tag, and
the data conversion unit transmits the link destination data to the DLNA client after converting the link destination data to a format playable by the DLNA client.

2. The DLNA content conversion device according to claim 1, wherein
the communications unit receives, from the DLNA client, a play request with respect to the navigation item linked to the HTML data held by the root container, and
the data conversion unit retrieves, from the web server, the HTML data that is subject to the play request, and transmits the HTML data to the DLNA client after converting the HTML data to a format playable by the DLNA client.

3. The DLNA content conversion device according to claim 1, wherein, if the link destination data is HTML data,
the data conversion unit converts the link destination data using a same procedure as in converting the structure of navigation tags represented by the HTML data retrieved by the communications unit when the communications unit receives a Browse request with respect to the root container, and
the data conversion unit sends a reply with the converted link destination data.

4. The DLNA content conversion device according to claim 1, further comprising a state storage unit adapted to store a screen state of the HTML data, the screen state representing a state after the DLNA client manipulates one of the navigation tags describing a request parameter of a FORM tag of HTML, wherein
the communications unit receives from the DLNA client an operation instruction regarding the navigation tags,
the data conversion unit applies the operation instruction received by the communications unit to the navigation tag representing the request parameter of the FORM tag,
the data conversion unit stores on the state storage unit the screen state of the HTML data after applying the operation instruction, and
the data conversion unit transmits to the DLNA client the screen state after converting the screen state to a format playable by the DLNA client.

5. A DLNA (Digital Living Network Alliance) content conversion method comprising:
converting, by a data conversion unit of a DLNA content conversion device, a structure of navigation tags represented by HTML (Hyper Text Markup Language) data into a folder structure on a DLNA server having the same hierarchical structure as a hierarchical structure of the navigation tags;
communicating, by a communications unit of the DLNA content conversion device, with a DLNA client and a web server;
upon receiving, from the DLNA client, a Browse request requesting transmission of a list of content held by a root container, retrieving the HTML data that the web server holds by the communications unit;
converting, by the data conversion unit, a structure of navigation tags represented by the HTML data retrieved from web server by the communications unit into the folder structure on the DLNA server;
sending, by the conversion unit, a reply to the DLNA client with, as the list of content held by the root container, a navigation item linked to the HTML data retrieved from the web server by the communications unit and the folder structure obtained by converting the structure of the navigation tags;
converting by the data conversion unit, into a folder in the folder structure, a link tag describing a link to another file on the web server;
receiving, by the communications unit, a Browse request to transmit a list of contents stored in the folder converted by the data conversion unit from the link tag;

retrieving by the communications unit, from the web server, link destination data that is a link destination of the link tag; and transmitting, by the data conversion unit, the link destination data to the DLNA client after converting the link destination data to a format playable by the DLNA client.

6. The DLNA content conversion method according to claim 5, further comprising:

receiving by the communications unit, from the DLNA client, a play request with respect to the navigation item linked to the HTML data held by the root container; and retrieving by the data conversion unit, from the web server, the HTML data that is subject to the play request, and transmitting the HTML data to the DLNA client after converting the HTML data to a format playable by the DLNA client.

7. The DLNA content conversion method according to claim 5, further comprising, if the link destination data is HTML data:

converting, by the data conversion unit, the link destination data using a same procedure as in converting the structure of navigation tags represented by the HTML data retrieved by the communications unit when the communications unit receives a Browse request with respect to the root container; and sending, by the data conversion unit, a reply with the converted link destination data.

8. The DLNA content conversion method according to claim 5, further comprising:

receiving, by the communications unit, from the DLNA client an operation instruction regarding the navigation tags;

applying, by the data conversion unit, the operation instruction received by the communications unit to one of the navigation tags representing the request parameter of a FORM tag;

storing, by the data conversion unit on a state storage unit a screen state of the HTML data after applying the operation instruction, the screen state representing a state after the DLNA client manipulates the navigation tag describing a request parameter of the FORM tag of HTML; and transmitting, by the data conversion unit to the DLNA client, the screen state after converting the screen state to a format playable by the DLNA client.

9. A non-transitory computer-readable storage medium storing a DLNA (Digital Living Network Alliance) content conversion program that when executed by a computer causes the computer to;

convert a structure of navigation tags represented by HTML (HyperText Markup Language) data into a folder structure on a DLNA server having the same hierarchical structure as a hierarchical structure of the navigation tags;

communicate with a DLNA client and a web server;

upon receiving, from the DLNA client, a Browse request requesting transmission of a list of content held by a root container, retrieve the HTML data that the web server holds;

convert a structure of navigation tags represented by the HTML data retrieved from the web server by the communications unit into the folder structure on the DLNA server;

send a reply to the DLNA client with, as the list of content held by the root container, a navigation item linked to the HTML data retrieved from the web server by the communications unit and the folder structure obtained by converting the structure of the navigation tags;

convert, into a folder in the folder structure, a link tag describing a link to another file on the web server;

receive a Browse request to transmit a list of contents stored in the folder converted by the data conversion unit from the link tag;

retrieve, from the web server, link destination data that is a link destination of the link tag; and transmit the link destination data to the DLNA client after converting the link destination data to a format playable by the DLNA client.

10. The non-transitory computer-readable storage medium according to claim 9, wherein the DLNA content conversion program further causes the computer to:

receive by the communications unit, from the DLNA client, a play request with respect to the navigation item linked to the HTML data held by the root container; and retrieve by the data conversion unit, from the web server, the HTML data that is subject to the play request, and transmitting the HTML data to the DLNA client after converting the HTML data to a format playable by the DLNA client.

11. The non-transitory computer-readable storage medium according to claim 9, wherein the DLNA content conversion program further causes the computer, if the link destination data is HTML data, to:

convert, by the data conversion unit, the link destination data using a same procedure as in converting the structure of navigation tags represented by the HTML data retrieved by the communications unit when the communications unit receives a Browse request with respect to the root container; and send, by the data conversion unit, a reply with the converted link destination data.

12. The non-transitory computer-readable storage medium according to claim 9, wherein the DLNA content conversion program further causes the computer to:

receive, by the communications unit, from the DLNA client an operation instruction regarding the navigation tags;

apply, by the data conversion unit, the operation instruction received by the communications unit to one of the navigation tags representing the request parameter of a FORM tag;

store, by the data conversion unit on a state storage unit a screen state of the HTML data after applying the operation instruction, the screen state representing a state after the DLNA client manipulates the navigation tag describing a request parameter of the FORM tag of HTML; and transmit, by the data conversion unit to the DLNA client, the screen state after converting the screen state to a format playable by the DLNA client.

* * * * *